(12) United States Patent
Dehlinger et al.

(10) Patent No.: US 7,024,408 B2
(45) Date of Patent: Apr. 4, 2006

(54) TEXT-CLASSIFICATION CODE, SYSTEM AND METHOD

(75) Inventors: Peter J. Dehlinger, Palo Alto, CA (US); Shao Chin, Santa Cruz, CA (US)

(73) Assignee: Word Data Corp., Palo Alto, CA (US)

( * ) Notice: Subject to any disclaimer, the term of this patent is extended or adjusted under 35 U.S.C. 154(b) by 338 days.

(21) Appl. No.: 10/612,644

(22) Filed: Jul. 1, 2003

(65) Prior Publication Data

US 2004/0049498 A1   Mar. 11, 2004

Related U.S. Application Data

(63) Continuation-in-part of application No. 10/438,486, filed on May 15, 2003, which is a continuation-in-part of application No. 10/374,877, filed on Feb. 25, 2003, which is a continuation-in-part of application No. 10/261,970, filed on Sep. 30, 2002, and a continuation-in-part of application No. 10/261,971, filed on Sep. 30, 2002, and a continuation-in-part of application No. 10/262,192, filed on Sep. 30, 2002, which is a continuation-in-part of application No. PCT/US02/21200, filed on Jul. 3, 2002.

(60) Provisional application No. 60/394,204, filed on Jul. 5, 2002.

(51) Int. Cl.
*G06F 17/30* (2006.01)

(52) U.S. Cl. ............... 707/5; 707/6; 704/7; 704/9

(58) Field of Classification Search ............ 707/5, 707/6, 3; 704/5
See application file for complete search history.

(56) References Cited

U.S. PATENT DOCUMENTS 4,554,631 A   11/1985 Reddington
5,297,039 A   3/1994 Kanaegami et al.
5,694,592 A   12/1997 Driscoll (Continued)

FOREIGN PATENT DOCUMENTS

EP   0 524 385 A2   1/1993

(Continued)

OTHER PUBLICATIONS

Strzalkowski, T. et al., "Natural language information retrieval in digital libraries", ACM 117-125, 1996.

(Continued)

*Primary Examiner*—Jean M. Corrielus
(74) *Attorney, Agent, or Firm*—Peter J. Dehlinger

(57) ABSTRACT

Disclosed are a computer-readable code, system and method for classifying a target document in the form of a digitally encoded natural-language text as belonging to one or more of two or more different classes. For each of a plurality of non-generic words and/or words groups characterizing the target document, there is determined a selectivity value calculated as the frequency of occurrence of that term in a library of texts in one field, relative to the frequency of occurrence of the same term in one or more other libraries of texts in one or more other fields, respectively, and the document is represented as a vector of terms, where the coefficient assigned to each term is a function of the selectivity value determined for that term. There is then determined, for each of the plurality of sample texts having associated classification identifiers, a match score related to the number of descriptive terms present in or derived from that text that match those in the target text. From the selected matched texts, and the associated classification identifiers, a classification determination of the target document is made.

22 Claims, 25 Drawing Sheets

U.S. PATENT DOCUMENTS

| | | |
|---|---|---|
| 5,745,889 A | 4/1998 | Burrows |
| 5,745,890 A | 4/1998 | Burrows |
| 5,752,051 A | 5/1998 | Cohen |
| 5,867,811 A | 2/1999 | O'Donoghue |
| 5,873,056 A | 2/1999 | Liddy et al. |
| 5,893,102 A | 4/1999 | Maimone et al. |
| 5,915,249 A | 6/1999 | Spencer |
| 5,937,422 A | 8/1999 | Nelson et al. |
| 5,983,171 A | 11/1999 | Yokoyama et al. |
| 6,006,221 A | 12/1999 | Liddy et al. |
| 6,006,223 A | 12/1999 | Agrawal et al. |
| 6,009,397 A | 12/1999 | Siegel |
| 6,081,774 A | 6/2000 | de Hita et al. |
| 6,088,692 A | 7/2000 | Driscoll |
| 6,216,102 B1 | 4/2001 | Martino et al. |
| 6,275,801 B1 | 8/2001 | Novak et al. |
| 6,279,017 B1 | 8/2001 | Walker |
| 6,374,210 B1 | 4/2002 | Chu |
| 6,393,389 B1 | 5/2002 | Chanod et al. |
| 6,415,250 B1 | 7/2002 | van den Akker |
| 6,529,902 B1 | 3/2003 | Kanevsky et al. |
| 6,574,632 B1 * | 6/2003 | Fox et al. .................. 707/102 |
| 6,633,868 B1 | 10/2003 | Min et al. |
| 6,665,668 B1 | 12/2003 | Sugaya et al. |
| 6,669,091 B1 | 12/2003 | Sharpe et al. |
| 6,687,689 B1 | 2/2004 | Fung et al. |
| 6,741,959 B1 * | 5/2004 | Kaiser ........................ 704/7 |
| 2002/0022974 A1 | 2/2002 | Lindh |
| 2002/0052901 A1 | 5/2002 | Guo et al. |
| 2003/0026459 A1 | 2/2003 | Won et al. |
| 2003/0028566 A1 | 2/2003 | Nakano |
| 2004/0015481 A1 | 1/2004 | Zinda |
| 2004/0024733 A1 | 2/2004 | Won et al. |
| 2004/0111388 A1 | 6/2004 | Boiscuvier et al. |
| 2004/0186833 A1 | 9/2004 | Watts |
| 2004/0230568 A1 | 11/2004 | Budzyn |

FOREIGN PATENT DOCUMENTS

| | | |
|---|---|---|
| EP | 0 597 630 A1 | 5/1994 |
| EP | 0 813 158 A2 | 12/1997 |
| EP | 1 011 056 A1 | 6/2000 |
| EP | 1 049 030 A1 | 11/2000 |
| EP | 1 168 202 A2 | 1/2002 |
| GB | 2264186 A1 | 8/1993 |
| WO | WO 99/10819 | 3/1999 |
| WO | WO 03/079231 A1 | 9/2003 |

OTHER PUBLICATIONS

Michael, J. B. et al., "Natural-language processing support for developing policy-governed software systems", 39th Intl. Conf. on Techn. for Object-oriented Lang. and Syst., IEEE Computer Soc. Press, pp. 263-274, Jul. 2001.

Lin, D. and Pantel, P., "Induction of Semantic Classes from Natural Language Text", KDD, ACM 2001, 6 pages.

Berg, G., "A connectionist Parser with Recursive Sentence Structure and lexical Disambiguation", Proc. Tenth National conf. on Artificial Intelligence—AAA1-92, 1992, 6 pages.

Niwa, Y. et al., "Patent Search: A Case Study of Cross-DB Associative Search", Proc. Of the Third NTCIR Workshop, 2003 Natl. Inst. of Informatics, 7 pages.

Larkey, L., "A Patent Search and Classification System", Proc. Of DL-99, 4th ACM Conference on Digital Libraries, 1999, 9 pages.

Cohen, W., "Text Categorization and Relational Learning", Proc. of 12th Intl. Conference (ML95) on Machine Learning, 1995, 9 pages.

Krahmer, E. and Theune, M., "Context Sensitive Generation of Descriptions", 1998, 4 pages.

Meyer, H. et al., "The Xircus Search Engine", Univ. of Rostock, Database Research Group, 2003, 6 pages.

Ford, G. et al., "Patern matching techniques for correcting low confidence OCR words in a known context", Natl. Library of Medicine, Bethesda, Maryland 20894, 9 pages.

* cited by examiner

TEXT-CLASSIFICATION CODE, SYSTEM AND METHOD

This application is a continuation-in-part of U.S. patent application Ser. No. 10/438,486 filed May 15, 2003, which is a continuation-in-part of U.S. patent application Ser. No. 10/374,877 filed Feb. 25, 2003, which is a continuation-in-part of U.S. patent application Ser. No. 10/261,970 filed Sep. 30, 2002, and also a continuation-in-part of U.S. patent application Ser. No. 10/261,971 filed Sep. 30, 2002, and also a continuation-in-part of U.S. patent application Ser. No. 10/262,192 filed Sep. 30, 2002, which are all continuations-in-part of PCT patent application Ser. No. PCT/US02/21200 filed Jul. 3, 2002. The present application also claims the priority benefit of U.S. Provisional Patent Application Serial No. 60/394,204 filed Jul. 5, 2002. All of the above applications are incorporated in their entirety herein by reference.

FIELD OF THE INVENTION

This invention relates to the field of text classification, and in particular, to a method, machine-readable code, and system for classifying a natural language text into one or more classes of fields or categories.

BACKGROUND OF THE INVENTION

Organizations that routinely handle a large number of digitally processed texts, such as funding agencies, legal reporter services, governmental patent offices, scientific or technical journal publishers, or large corporations, are often faced with the task of classifying newly received or generated documents into one or more of a plurality of different classes, typically for purposes of further document processing.

For example, a large funding agency, such as the NIH or the NSF will typically receive thousands of grant proposals for research funding each month. Before a proposal can be forwarded to the proper group for evaluation, it must be classified as to general funding area, so it can be sent to the appropriate grant-review group.

As another example, a patent office may receive thousands of electronically filed patent applications each week. Before these documents can be further processed by substantive examination, they must first be classified as to patent class, and optionally, subclass, and forwarded to the appropriate art unit or technical center for examination.

Publishers of legal texts or scientific and technical reports or papers may receive thousands of publication submissions per week, and these must be first be classified according to legal area or scientific or technical area before further archiving or publication, or for forwarding to an appropriate editorial review group.

It would thus be desirable to provide an automated text classification system that is able to accurately, that is, within some defined performance limits, classify electronic documents into one or more different classes or categories, typically as a first step in document processing or for purposes of document control.

SUMMARY OF THE INVENTION

The invention includes, in one aspect, a computer-executed method for classifying a target document in the form of a digitally encoded natural-language text into one or more of two or more different classes. For each of a plurality of terms selected from one of (i) non-generic words in the document, (ii) proximately arranged word groups in the document, and (iii) a combination of (i) and (ii), there is determined a selectivity value calculated as the frequency of occurrence of that term in a library of texts in one field, relative to the frequency of occurrence of the same term in one or more other libraries of texts in one or more other fields, respectively, and the document is then represented as a vector of terms, where the coefficient assigned to each term is a function of the selectivity value determined for that term.

There is then determined, for each of a plurality of sample texts, a match score related to the number of descriptive terms present in or derived from that text that match those in the target document. Each of the plurality of sample texts has an associated classification identifier that identifies the one of more different classes to which that sample text belongs. One or more of the sample texts having the highest match scores are selected, the classification identifier(s) associated with the selected text(s) are recorded, and the one or more recorded classification identifiers are associated with the target document, thus classifying the target document.

The sample texts are preferably texts in the libraries of texts from which the selectivity values of target terms are determined.

Each library of texts may be defined by one or more text classifications, and the method may further include, following the classifying step, adding the target document in one of the library of texts corresponding to the target text classification.

The selectivity value associated with a term in may be related to the greatest selectivity value determined with respect to each of a plurality $N \geq 2$ of libraries of texts in different fields. In one preferred embodiment, the selectivity value assigned to a descriptive term is a root (logarithmic) function of the frequency of occurrence of that term in the library, relative to the frequency of occurrence of the same term in one or more other libraries of texts in one or more other fields, respectively. Exemplary root functions are between 2, a square root function, and 3, a cube root function.

The vector may be constructed using only terms having a selectivity value above a predetermined threshold. Where the terms include words in the document, the coefficient assigned to each word in the vector may also be related to the inverse document frequency of that word in one or more of said libraries of texts. In an exemplary method, the coefficient assigned to each word in the vector is the product of a function of the selectivity value and the inverse document frequency of that word.

In one general embodiment, the step of determining term selectivity values and/or determining sample texts with the highest match scores is carried out by accessing a text database containing the libraries of texts, either in processed or unprocessed form, where each text has an associated library identifier, text identifier, and classification identifier.

In a second general embodiment, the steps of determining term selectivity values and/or determining sample texts with the highest match scores are carried out by accessing a word-records database, where each record includes or is linked to text identifiers of the library texts that contain that word, associated library and classification identifiers for each text, and optionally, one or more selectivity values associated with that word.

Where the terms in the document include words in the document, the step of determining word selectivity values may include (i) accessing the database of word records, and (ii) using the identified text and library identifiers to calculate one or more selectivity values for that word. The step of determining match scores may include (i) accessing the database of word records to identify library texts associated with each descriptive word in the target text, and (ii) from the identified texts recorded in step (i), determining text match score based on the number of descriptive words in that text weighted by the selectivity values of the matching words.

Where the terms include word groups in the document, the word-records database may include, for each word record, word-position identifiers. Here the step of determining selectivity values for word groups may include i (i) accessing the word-records database to identify texts and associated library and word-position identifiers associated with that word group, (ii) from the identified texts, library identifiers, and word-position identifiers recorded in step and (i) determining one or more selectivity values for that word group. The step of determining match scores may include (i) recording the texts associated with each descriptive word group, and (ii) determining a text match score based, at least in part, on number of descriptive word groups in a text, weighted by the selectivity values of such words groups.

The sample texts and corresponding classification identifiers may be:

(a) libraries of different-field patent texts, where the classification identifier includes at least one patent class and, optionally, at least one patent subclass;

(b) libraries of different-field research grant proposals or reports, where the classification identifier includes a research funding class within a funding agency;

(c) libraries of case reports or head notes relating to different legal topics, where the classification identifier includes one or more different legal topics; and (d) libraries of different-field scientific or technical texts, where the classification identifier includes at least one of a plurality of different science or technology field classifications.

In another aspect, the invention includes an automated system for classifying a target document in the form of a digitally encoded text as belonging to one or more of a plurality of different classes. The system includes (1) a computer, (2) a word-records database that is accessible by the computer, and 3) a computer-readable code for controlling the system operations of the computer.

Each word record in the word-record database includes text identifiers of the library texts that contain that word, an associated library identifier for each text, an associated classification identifier for each text, and optionally, one or more selectivity values for each word, where the selectivity value of a word in a library of texts in a field is related to the frequency of occurrence of that word in the library, relative to the frequency of occurrence of the same word in one or more other libraries of texts in one or more other fields, respectively.

The computer-readable code is operable to control the computer to carry out the steps of the classification method described above using the word-records database.

In still another aspect, the invention includes computer-readable code for use with an electronic computer and a word-records database in classifying a target document in the form of a digitally encoded text as belonging to one or more of a plurality of different classes.

These and other objects and features of the invention will become more fully apparent when the following detailed description of the invention is read in conjunction with the accompanying drawings.

DETAILED DESCRIPTION OF THE INVENTION

A. Definitions

Figure 1:
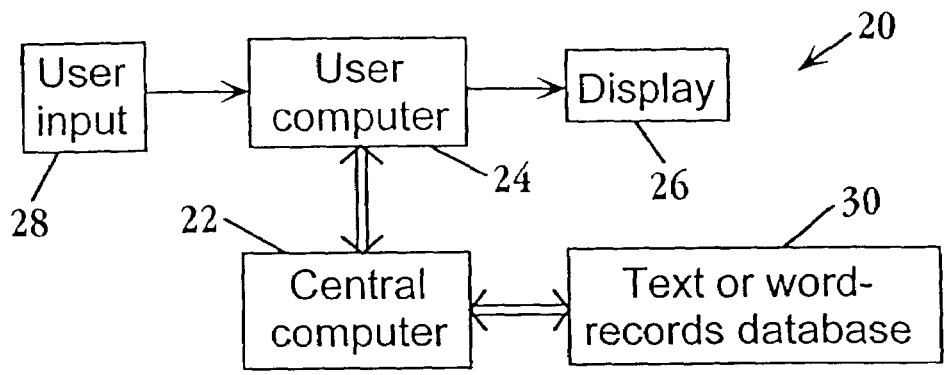
FIG. 1 illustrates components of a text processing, searching, and classifying apparatus or system in accordance with the invention.

"Natural-language text" refers to text expressed in a syntactic form that is subject to natural-language rules, e.g., normal English-language rules of sentence construction. Examples include descriptive sentences, groups of descriptive sentences making up paragraphs, such as summaries and abstracts, single-sentence texts, such as patent claims, and full texts composed of multiple paragraphs.

A "verb-root" word is a word or phrase that has a verb root. Thus, the word "light" or "lights" (the noun), "light" (the adjective), "lightly" (the adverb) and various forms of "light" (the verb), such as light, lighted, lighting, lit, lights, to light, has been lighted, etc., are all verb-root words with the same verb root form "light," where the verb root form selected is typically the present-tense singular (infinitive) form of the verb.

"Verb form" refers to the form of a verb, including present and past tense, singular and plural, present and past participle, gerund, and infinitive forms of a verb. "Verb phrase" refers to a combination of a verb with one or more auxiliary verbs including (i) to, for, (ii) shall, will, would, should, could, can, and may, might, must, (iii) have has, had, and (iv) is are, was and were. Verb-root words expressed in a common verb form means that the words have the same form, e.g., present tense, singular form.

"Target text" or "input text" refers to a text that is to be classified.

"Abstract" refers to a summary form, typically composed of multiple sentences, of an idea, concept, invention, discovery or the like. Examples, include abstracts from patents and published patent applications, journal article abstracts, and meeting presentation abstracts, such as poster-presentation abstracts, abstract included in grant proposals, and case notes or legal-principle summaries.

"claim" refers to a claim in a patent application or issued patent.

"Full text" refers to the full text of an article, patent, case-law report, business article, and the like.

"Field" refers to a given technical, scientific, legal or business field, as defined, for example, by a specified technical field, or a patent classification, including a group of patent classes (superclass), classes, or sub-classes, or a legal field or speciality, such "torts" or "negligence" or "property rights", as well as to different grant-funding groups or categories within a funding agency, or to different levels of security of documents, e.g., "confidential," "limited access," "not for email dissemination," and so on.

"Generic words" refers to words in a natural-language text that are not descriptive of, or only non-specifically descriptive of, the subject matter of the text. Examples include prepositions, conjunctions, pronouns, as well as certain nouns, verbs, adverbs, and adjectives that occur frequently in texts from many different fields. The inclusion of a word in a database of generic words, e.g., in a look-up table of generic words, is somewhat arbitrary, and can vary with the type of text analysis being performed, and the field of search being conducted, as will be appreciated below. Typically generic words have a selectivity value in any group of related libraries, e.g., libraries of different patent classes or superclasses, (see below) less than about 1.25.

"Non-generic words" are those words in a text remaining after generic words are removed. The following text, where generic words are enclosed by brackets, and non-generic words, left unbracketed, will illustrate:

[A method and apparatus for] treating psoriasis [includes a] source [of] incoherent electromagnetic energy. [The] energy [is] directed [to a region of] tissue [to be] treated. [The] pulse duration [and the] number [of] pulses [may be] selected [to] control treatment parameters [such as the] heating [of] healthy tissue [and the] penetration depth [of the] energy [to] optimize [the] treatment. [Also, the] radiation [may be] filtered [to] control [the] radiation spectrum [and] penetration depth.

A "sentence" is a structurally independent grammatical unit in a natural-language written text, typically beginning with a capital letter and ending with a period. In the example above, the first sentence of the text is "A method and apparatus for treating psoriasis includes a source of incoherent electromagnetic energy." A sentence in a patent claim may include, separately, the claim preamble and individual elements of the claim.

"Distilled text" means text, e.g., a sentences or phrases, from which generic words have been removed. In the example above, the first sentence, reduced to a distilled sentence, reads: "treating psoriasis source incoherent electromagnetic energy."

A "word string" is a sequence of words in a distilled sentence. The word string may be a distilled sentence or phrases or a subset thereof, in the case where the distilled sentence is parsed into two or more separate word strings.

A "word group" is a group, typically a pair, of non-generic words that are proximately arranged in a natural-language text. Typically, words in a word group are non-generic words in the same sentence. More typically they are nearest or next-nearest non-generic word neighbors in a string of non-generic words, e.g., a word string. As an example, the above distilled sentence and word string "treating psoriasis source incoherent electromagnetic energy" might include the wordpairs "treating psoriasis," treating source," "psoriasis source," "psoriasis incoherent," source incoherent," source electromagnetic," and so forth until all combination of nearest neighbors and next-nearest neighbors are considered.

Words and optionally, words groups, usually encompassing non-generic words and wordpairs generated from proximately arranged non-generic words, are also referred to herein as "terms".

"Digitally-encoded text" refers to a natural-language text that is stored and accessible in computer-readable form, e.g., computer-readable abstracts or patent claims or other text stored in a database of abstracts, full texts or the like.

"Processed text" refers to computer readable, text-related data resulting from the processing of a digitally-encoded text to generate one or more of (i) non-generic words, (ii) wordpairs formed of proximately arranged non-generic words, (iii) word-position identifiers, that is, sentence and word-number identifiers.

"Library of texts in a field" refers to a library of texts (digitally encoded or processed) that have been preselected or flagged or otherwise identified to indicate that the texts in that library relate to a specific field or area of specialty, e.g., a patent class, patent subclass, or patent superclass. For example, a library may include patent abstracts from each of up to several related patent classes, from one patent class only, or from individual subclasses only. A library of texts typically contains at least 100 texts, and may contain up to 1 million or more.

"Frequency of occurrence of a term (word or word group) in a library" is related to the numerical frequency of the term in the library of texts, usually determined from the number of texts in the library containing that term, per total number of texts in the library or per given number of texts in a library. Other measures of frequency of occurrence, such as total number of occurrences of a term in the texts in a library per total number of texts in the library, are also contemplated.

The "selectivity value" of a term (word or word group) in a library of texts in a field is related to the frequency of occurrence of that term in that library, relative to the frequency of occurrence of the same term in one or more other libraries of texts in one or more other fields, respectively. The measure of frequency of occurrence of a term is preferably the same for all libraries, e.g., the number of texts in a library containing that term. The selectivity value of a given term for a given field is typically determined as the ratio of the percentage texts in that field that contain that term, to the percentage texts in one or more unrelated field that contain the same term. A selectivity value so measured may be as low as 0.1 or less, or as high as 1,000 or greater. The selectivity value of a word in a library in a field indicates the "field specificity" or "degree of descriptiveness" of that word in that field.

Typically a separate selectivity value is calculated for each of a plurality of $N \geq 2$ selected fields, e.g., given technical fields, with respect to one or more other fields, i.e., fields outside the given technical field. The selectivity value then associated with a term is the highest selected value calculated for each of the N different fields, or the selectivity value calculated for each different library, or one or more libraries of interest, or the average selectivity value calculated for some subset of selectivity values, e.g., for all libraries in some defined set of libraries.

In calculating the selectivity values of word groups, the word groups in the texts in each of the selected-field libraries and in the libraries of one or more other fields represent word groups generated from proximately arranged non-generic words in digitally encoded texts in the selected and other fields, respectively.

A "function of a selectivity value" a mathematical function of a calculated numerical-occurrence value, such as the selectivity value itself, a root (logarithmic) function, a binary function, such as "+" for all terms having a selectivity value above a given threshold, and "−" for those terms whose selectivity value is at or below this threshold value, or a step function, such as 0, +1, +2, +3, and +4 to indicate a range of selectivity values, such as 0 to 1, >1–3, >3–7, >7–15, and >15, respectively. One preferred selectivity value function is a root (logarithm or fractional exponential) function of the calculated numerical occurrence value. For example, if the highest calculated-occurrence value of a term is X, the selectivity value function assigned to that term, for purposes of text matching, might be $X^{1/2}$ or $X^{1/2.5}$, or $X^{1/3}$.

"Inverse document frequency" or "IDF" refers to a function related to the inverse of frequency of a term, typically a word, in a set of documents, typically a database of document, but optionally, a library of documents within a database. The IDF is typically designed so that some low threshold number of term occurrences, e.g., 3–5 is assigned a value of 1, and this number decreases linearly to zero or some low number, with increasing document frequency of the term. The IDF function shown in FIG. 12B is exemplary. If the document occurrence of a term (e.g., word) is less than 3, the term is ignored. At an occurrence of 3, the IDF is assigned a value of 1. This function falls linearly to a document frequency of 5,000 and greater, at which and above which, the IDF is assigned a value of 0.2.

A "vector of terms" means a representation of a set of terms $t_i$, i.e., words and/or word groups, in the form: $c_1 t_1 + c_2 t_2 + c_3 t_3 + \ldots c_n t_n$, where the vector is n-dimensional (contains n terms t) and the coefficient $c_i$ associated with each term $t_i$ is related to the selectivity value of that term, i.e., includes a function of the selectivity value of that term. The coefficient associated with each word is also preferably related to the inverse document frequency of that word, and preferably the product of the IDF and the selectivity value function.

"Weighted by the coefficient" as applied to the weight given a term in a text, means that the term is weighted by the coefficient of that term, e.g., either a function of the selectivity value, for both words and word pairs, and the product of the function of the selectivity value and the IDF for a word.

A "text identifier" or "TID" identifies a particular digitally encoded or processed text in a database, such as patent number, assigned internal number, bibliographic citation or other citation information.

A "library identifier" or "LID" identifies the field, e.g., technical field patent classification, legal field, scientific field, security group, or field of business, etc. of a given text.

A "classification identifier" or "CID" identifies a particular class, e.g., class or subclass in a classification system to which a particular text in a text library may belong. Where a text library is defined as texts having a particular CID, the CID and LID will be identical. Typically a library will consist of several classes of texts; that is a plurality of different CIDs will be associated with a given LID.

"A word-position identifier" of "WPID" identifies the position of a word in a text. The identifier may include a "sentence identifier" or "SID" which identifies the sentence number within a text containing a given word or word group, and a "word identifier" or "WID" which identifiers the word number, preferably determined from distilled text, within a given sentence. For example, a WPID of 2–6 indicates word position 6 in sentence 2. Alternatively, the words in a text, preferably in a distilled text, may be number consecutively without regard to punctuation.

A "database" refers to one or more files of records containing information about libraries of texts, e.g., the text itself in actual or processed form, text identifiers, library identifiers, classification identifiers, one or more selectivity values, and word-position identifiers. The information in the database may be contained in one or more separate files or records, and these files may be linked by certain file information, e.g., text numbers or words, e.g., in a relational database format.

A "text database" refers to database of processed or unprocessed texts in which the key locator in the database is a text identifier. The information in the database is stored in the form of text records, where each record can contain, or be linked to files containing, (i) the actual natural-language text, or the text in processed form, typically, a list of all non-generic words and word groups, (ii) text identifiers, (iii) library identifiers identifying the library to which a text belong, (iv) classification identifiers identifying the classification of a given text, and (v), word-position identifiers for each word. The text database may include a separate record for each text, or combined text records for different libraries and/or different classification categories, or all texts in a single record. That is, the database may contain different libraries of texts, in which case each text in each different-field library is assigned the same library identifier, or may contain groups of texts having the same classification, in which case each text in a group is assigned the same classification identifier.

A "word database" or "word-records database" refers to database of words in which the key locator in the database is a word, typically a non-generic word. The information in the database is stored in the form of word records, where each record can contain, or be linked to files containing, (i) selectivity values for that word, (ii) identifiers of all of the texts containing that word, (iii), for each such text, a library identifier identifying the library to which that text belongs, (iv) for each such text, word-position identifiers identifying the position(s) of that word in that text, and (v) for each such text, one or more classification identifiers identifying the classification of that text. The word database preferably includes a separate record for each word. The database may include links between each word file and linked various identifier files, e.g., text files containing that word, or additional text information, including the text itself, linked to its text identifier. A word records database may also be a text database if both words and texts are separately addressable in the database.

"Sample texts" refers to texts that are searched for descriptive term matches with the target text, and which have classification descriptors by which a target text classification is determined. Typically, the sample texts are the library texts used in generating the selectivity values for the target-text terms. However, where the selectivity values and or IDFs of target-text terms are determined from an independent library of texts, the sample texts may be employed only for purposes of (i) identifying texts with the highest-term match scores with the target text, and (ii) using the classification identifiers associated with those sample texts to determine a classification for the target text.

A non-generic term (word or wordpair) is a "descriptive term" if that term has an assigned selectivity value in at least one library of texts of greater than some threshold value, preferably 1.25–5, e.g., 1.5, 2, or 2.5.

B. System and Method Overview

FIG. 1 shows the basic components of a text processing, search, and classification system 20 in accordance with the present invention. A cental computer or processor 22 receives user input and user-processed information from a user computer 24. The user computer has a user-input-device, such as a keyboard, modem, and/or disc reader 28 by which the user can enter target text. A display or monitor 26 displays word, wordpair, search, and classification information to the user. A text or word-records database 30 in the system is accessible by the central computer in carrying out operations of the system, as will be described.

It will be understood that "computer," as used herein, includes both computer processor hardware, and the computer-readable code that controls the operation of the computer to perform various functions and operations as detailed below. That is, in describing program functions and operations, it is understood that these operations are embodied in a machine-readable code, and this code forms one aspect of the invention.

In a typical system, the user computer is one of several remote access stations, each of which is operably connected to the central computer, e.g., as part of an Internet or intranet system in which multiple users communicate with the central computer. Alternatively, the system may include only one user/central computer, that is, where the operations described for the two separate computers are carried out on a single computer.

As indicated above, the system employs a database of text information that is typically either a text database or more typically, a word-record database. As defined above, a text database includes text information that is classified according to text identifiers, e.g., patent numbers, publication information, or other text ID numbers. One preferred text database includes separate database files for the texts in each of N different-field libraries. For example, for patent classification, these N different libraries might include patent texts in each of N different technical fields, e.g., medicine, organic chemistry, drugs, electronic, computers, and so forth, where each library may encompasses many patent classes. As another example, the different libraries might include different subspecialties within a large field, such as the field of medicine, or different grant-proposal groups, or different legal fields.

Figure 2A:
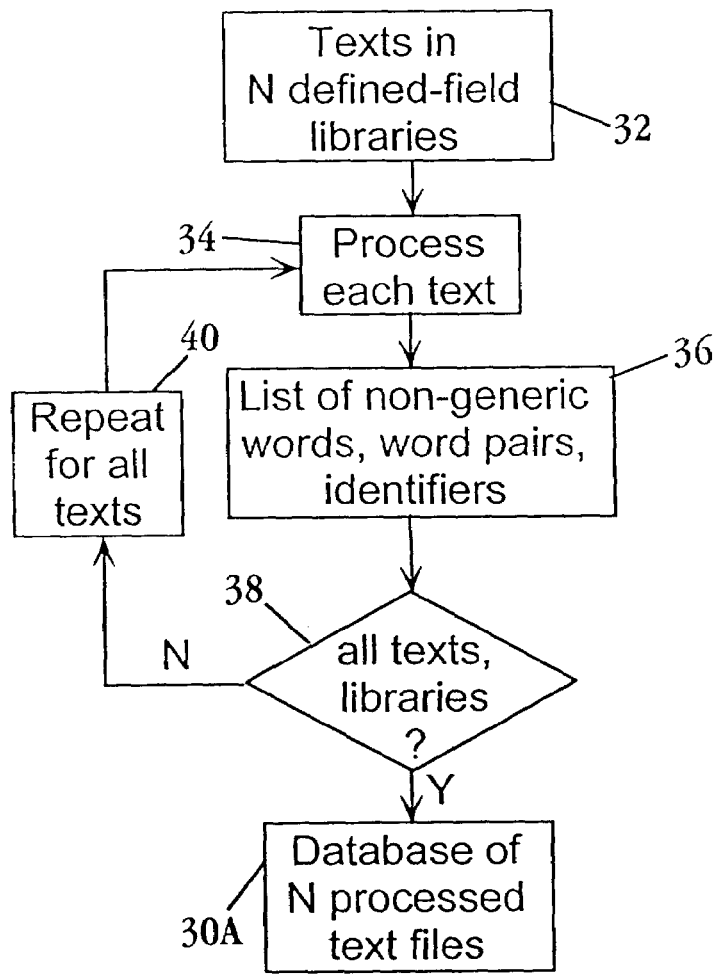
FIG. 2A is an overview flow diagram of steps in forming a database of N processed text files.

FIG. 2A shows in overview, operations used in constructing a text database of processed texts by processing a plurality of texts in $N \geq 2$ defined-field libraries, such as libraries 32, of digitally encoded texts, to form processed-text database 30A. Each of the N libraries contains a plurality of digitally encoded texts in a particular field or speciality that can be defined in one of a variety of ways, e.g., patent classes, subclasses or superclasses, different areas of fields of technology, or different areas of fields or legal or business activity. For example, the libraries may include patent abstracts from all patent classes related to surgical devices (one library), drugs and drug delivery (another library), electronic devices (a third library), and so on, where the categorization of the texts in the libraries is such that several distinct fields or areas of speciality are represented, allowing for the determination of meaningful selectivity values for terms from the texts, as will be described below.

As noted above, each library is a collection of digitally encoded texts, e.g., abstracts, summaries, and/or patent claims, along with pertinent identifying information, e.g., (i) pertinent patent information such as patent number, patent-office classification, inventor names, and patent filing and issues dates, (ii) pertinent journal-reference information, such as source, dates, and author, or (iii) pertinent law-reporter information, such as reporter name, dates, and appellate court.

Large collections of digitally processed texts making up the N text libraries may be obtained in tape or CD ROM form, available from a variety of sources, such as the U.S. Patent and Trademark Office, the European Patent Office PO, Dialog Search Service, legal reporter services, and other database sources whose database offerings are readily identifiable from their internet sites. In many of the examples described herein, the texts forming the libraries are from U.S. Patent Bibliographic databases which contain, for all patents issued between 1976 and 2000, various patent identifier information and corresponding patent abstracts. These databases are available in tape form from the USPTO.

With continued reference to FIG. 2A, the texts in the N libraries are processed by a text-processing module indicated at 34, and described below with reference to FIG. 5. Briefly, the module operates first to parse a text by punctuation and optionally, certain transition words, such as certain prepositions. The words in the text are then classified into one of three categories: (i) non-generic words, (ii) verb or verb-root words, and (iii) remaining words that tend to include predominantly nouns and adjectival words. The text remaining after removal of generic words—in other words, text consisting of distilled sentences—may be parsed into word strings typically 2–8 words long, where each distilled sentence may give rise to one or more word strings. The text-processing module uses a moving window algorithm to generate proximately arranged wordpairs in each of the word strings. Thus, the module processes a text into a list of non-generic words and word groups, e.g., proximately arranged wordpairs, and places these in a file along with associated text, library, word-position, and classification identifiers, as indicated at 36.

This process is repeated for all texts in all libraries, as indicated at 38, yielding a database 30A with N separate files, where each file contains all of the processed texts (words and wordpairs), and associated text, library, word, and classification identifiers for each text for a given library. Alternatively, the texts may be subdivided into other groups of files, e.g., separate files for each of the different classifications, or a separate file for each different text. Producing a text database is discussed further below with respect to FIG. 6.

Figure 2B:
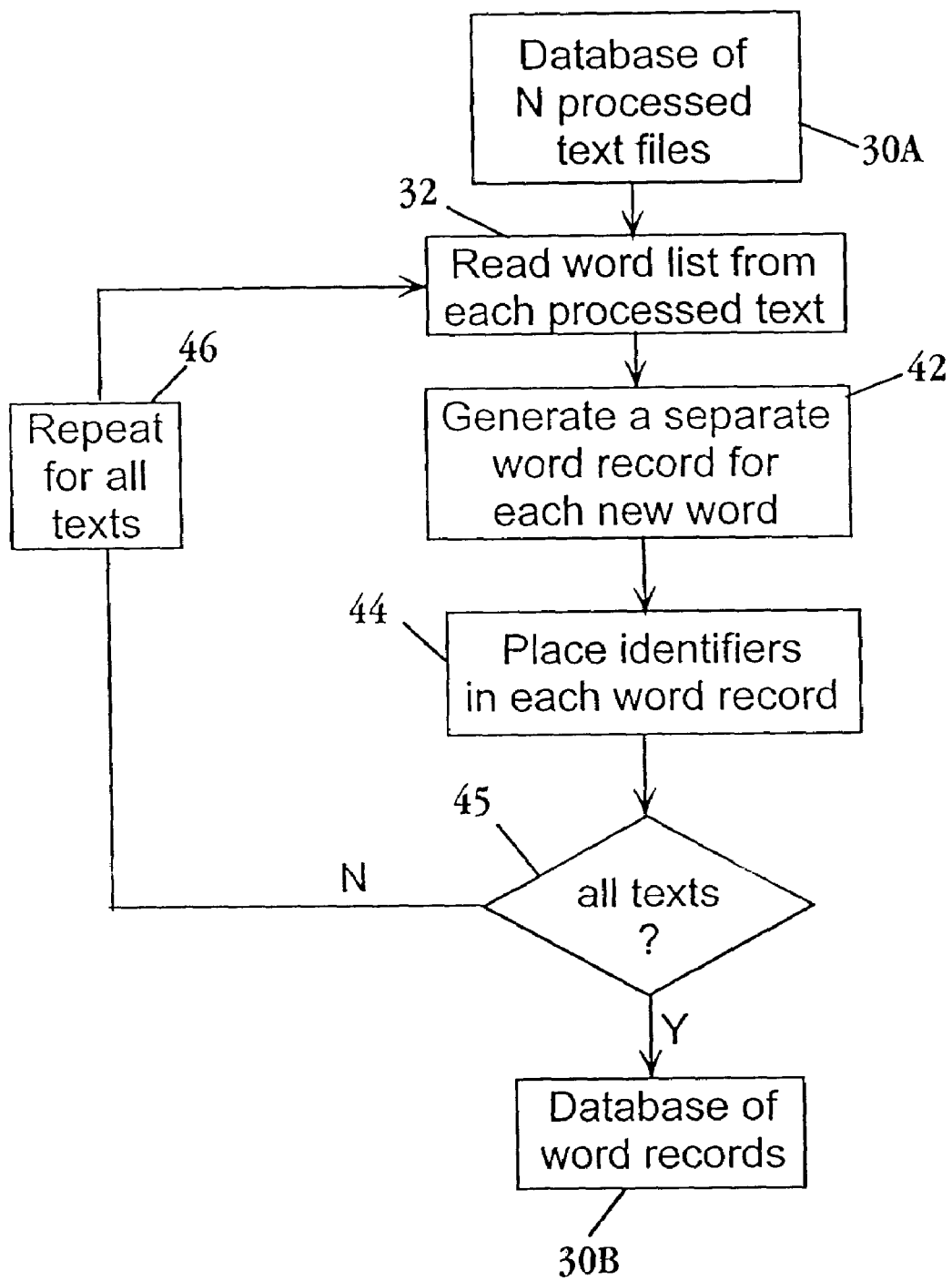
FIG. 2B is an overview flow diagram of steps in converting the database of processed text files produced in FIG. 2A to a word-records database.

FIG. 2B shows in overview flow diagram, steps in converting N processed text files from above to form a word-records database 30B. Here each processed text is selected and each word in the list of non-generic words is successively processed. If a non-generic word in the text being processed does not already have its own word record, the program generates a new record, as at 42, and places in that record, the corresponding text identifier, library and classification identifiers for that text, and word-position identifiers for that word. A word record may also contain selectivity values for that word, calculated as described below. If a non-generic word in the text being processed already has its own word record, the program adds the associated text, library, classification, and word-position identifiers to the already existing word record, as at 44. This process is repeated, through the logic at 45 and 46, until all of the non-generic words in all of the N-library texts are processed, yielding database 30B of individual word records, where each record includes (i) TIDs of all of the texts containing that word, (ii) the LID and CID for each text, and one or more WPIDs for that word in each listed text. It will be understood that some of the information in a "record" may be contained in linked files in a relational database, and that the database may have additional text information, e.g., actual text, stored in one or more separate files that can be accessed, e.g., by text identifier.

Information contained in the text or word-records database is used in five operations in the classification method of the invention. First, text and library information identifiers are used in calculating word selectivity values. Alternatively, a text or word-records database may include precalculated selectivity values, in which case the database is used to look up word selectivity values. Optionally, the database is also used to calculate word-group selectivity values, either by accessing the texts in a text database or accessing combined word records in a word-records database. The selectivity values of words, and optionally, word groups are used in identifying descriptive terms in the target texts, and as weighting factors in text matching.

Second, and optionally, the database is used in calculating an inverse document frequency for a term, particularly a word.

Third, the selectivity values and optionally, IDFs, are used in generating a word-string vector representing a target text, where the coefficients of the terms include a selectivity value function and optionally, particularly in the case of a word term, and IDF value.

Fourth, the vector representation of a target text is used in identifying texts having the highest term-match scores or overlap with the target-text term. In essence, this operation finds sample texts, e.g., library texts, having the greatest content overlap with target text.

Finally, classification identifiers associated with the highest matching texts are used in classifying the target text into one or more classifications.

Figure 3:
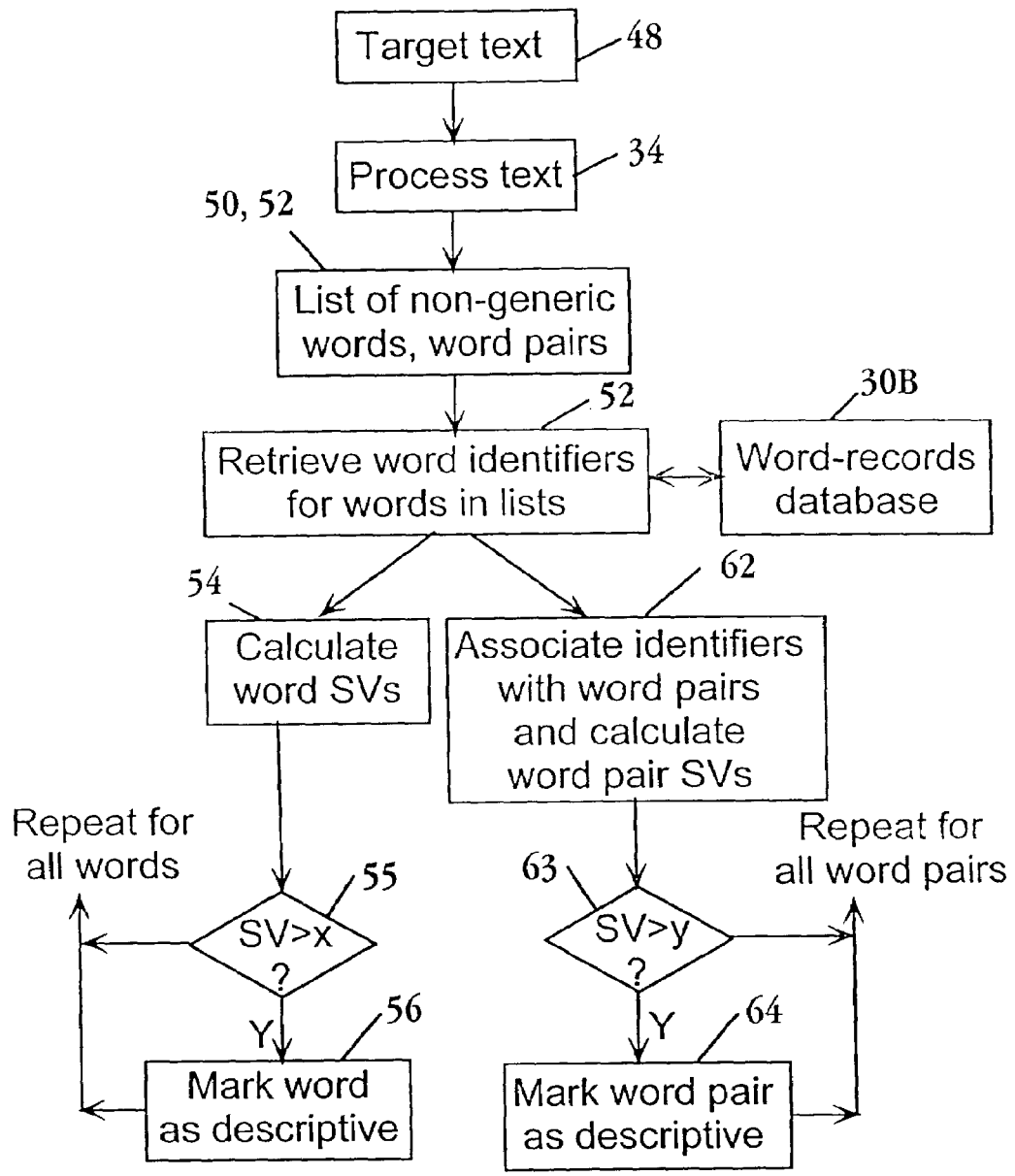
FIG. 3 is an overview flow diagram of steps in processing a natural-language target text to generate descriptive search terms.

FIG. 3 is an overview of program operations used for determining word and word-group selectivity values. Target text 48 in the figure is an abstract, claim, or other natural-language text, typically in condensed or abstract form, used to identify the subject matter of the document being classified. The target text, which may be entered by the user on user computer 24, is initially processed, as at 34, to generate a list 50 of non-generic words and, optionally, a list 52 of word pairs contained in the text. The processing of target text into non-generic words and word groups, e.g., word-pairs is carried out by a module described below with respect to FIG. 5.

With continuing reference to FIG. 3, non-generic words and wordpairs (collectively, terms) from the input target text are then used in performing the following functions: (i) For each word contained in the target text, the computer performs the function indicated at 53 of retrieving word identifiers from a text or word-records database, such as database 30B, for all looking up or calculating the corresponding selectivity value from information in a text or word-records database, as indicated at 54. Applying a default or user-supplied selectivity-value threshold x, indicated at 55, the computer marks words in list 50 having above-threshold selectivity values, e.g., in at least one library, as descriptive words. For example a default or user-supplied word selectivity value of 2 means that the computer would then mark, as "descriptive" words, only those input text words having a selectivity value of 2 or greater. This process is repeated successively for each word in word list 50.

Descriptive wordpairs, where considered, are determined using the word identifiers from 53, and calculating the selectivity values of target-text word groups, e.g., wordpairs, as indicated at 62, and as will be described below. The wordpair selectivity values are tested for above-threshold values, as indicated at 63, and those word pairs with above-threshold selectivity values, e.g., for at least one library, are marked as descriptive word pairs at 64.

The descriptive words and optionally, wordpairs, stored in the system may be displayed to the user, for one of the following user options. The user may accept the terms as pertinent and appropriate for the search to be conducted, without further editing; the user may add synonyms to one or more of the words (including words in the wordpairs) to expand the range of the search; the user may add or delete certain terms; and/or specify a lower or higher selectivity-value threshold for the word and/or wordpair terms, and ask the central computer to generate a new list of descriptive terms, based on new threshold values.

In a general embodiment, a calculated selectivity value is calculated as the frequency of occurrence of that term (word or wordpair), measured as the total number of texts containing that term, per total number of texts in that library to the frequency of occurrence of the same term in one or more other defined-field libraries. Thus for example, assume that the term "electromagnetic" is found in 1,500 of 50,000 texts in one defined-field library, and in 500 of 150,000 texts in three libraries representing three other defined fields, where each library contains 50,000 texts. The calculated selectivity value of the word, determined from the ratio of the frequency of occurrence of the term in the one library and the other libraries is therefore 15/500:5/1500, or 9.

It will be appreciated that by selecting a sufficiently large number of texts from each library, a statistically meaningful frequency of occurrence of any word from the library texts is obtained. In a preferred embodiment, the selectivity value of a given word is calculated with respect to each of N different fields, and the selectivity value that is assigned to that word, or associated with that database word, is the highest of the N selectivity values calculated. For example, if selectivity values for the word "electromagnetic" of 9, 3, 4.5, 0.3 and 0.7 are calculated for five different defined-field libraries, the selectivity value assigned that word would be 9. As indicated above, the selectivity value actually assigned to a term may be some function of the numerical-occurrence selectivity value, e.g., a root function.

An advantage of a word-records database, for many of the operations of the system is that database information can be accessed on a word-by-word basis, for the limited number of target words, rather than having to access each library text for information, in the case of a text database. For example, in determining the selectivity values of target words, the program can operate to (i) access the word record for that word, (ii) record the TIDs and LIDs in that word record, and (iii) use the identifiers to calculate one or more selectivity values, preferably one for each different-field library. A similar operation can be carried out for word pairs, by (i) accessing the word records for all, e.g., two words in the word group, (ii) recording the TIDs, LIDs, and WPIDs in the two or more word records, and (iii) using the identifiers to calculate one or more selectivity values, preferably one for each different-field library. Details of the program operations for determining word and wordpair selectivity values from both text and word-records databases are given below.

With the target-text descriptive terms so identified, the program then uses TIDs identified in the selectivity value calculations, or looked up from word-records in a word-records database, to find sample, e.g., library texts having the highest term-overlap with the descriptive terms in the target texts. The purpose of this operation is to identify those texts in a large collection of digitally encoded texts that most closely match the target text in content. The rationale of the search method is based on two strategies for extracting content from natural-language texts, in accordance with the invention:

First, the search uses selectivity values to identify those terms, i.e., words and optionally, word groups, having the most pertinence to the content of the input text, that is, terms that are most descriptive of the target text. These words and word pairs are used as n-terms in an n-dimensional search vector. Each term in the vector is assigned a coefficient c that reflects the relative content and distinctiveness "value" of that term in the vector. Preferably, this coefficient is the product of a function of the selectivity value and the IDF for a word term, and a function of the selectivity value for a word pair. The vector is then used in retrieving documents having overlapping vector terms, with a match score being calculated from the weighted value of the overlapping terms, e.g., weighted by the coefficients of the overlapping terms. After considering all texts with overlapping terms, the program finds the highest possible match scores, e.g., global maximum word and wordpair overlap.

As just noted, the match score preferably reflects the relative "content" value of the different search terms, as measured, at least in part, by the selectivity values of the matched terms. The actual-occurrence selectivity values may present too great an extreme in values, in that high-value terms may dominate the match scores. For this reason, the actual selectivity values assigned to the target-text terms are preferably modulated by a root function or geometric function. As will be seen in Example 1 below, a preferred root function is between 2, the square root and 3, the cube root of the calculated occurrence value.

Figure 4:
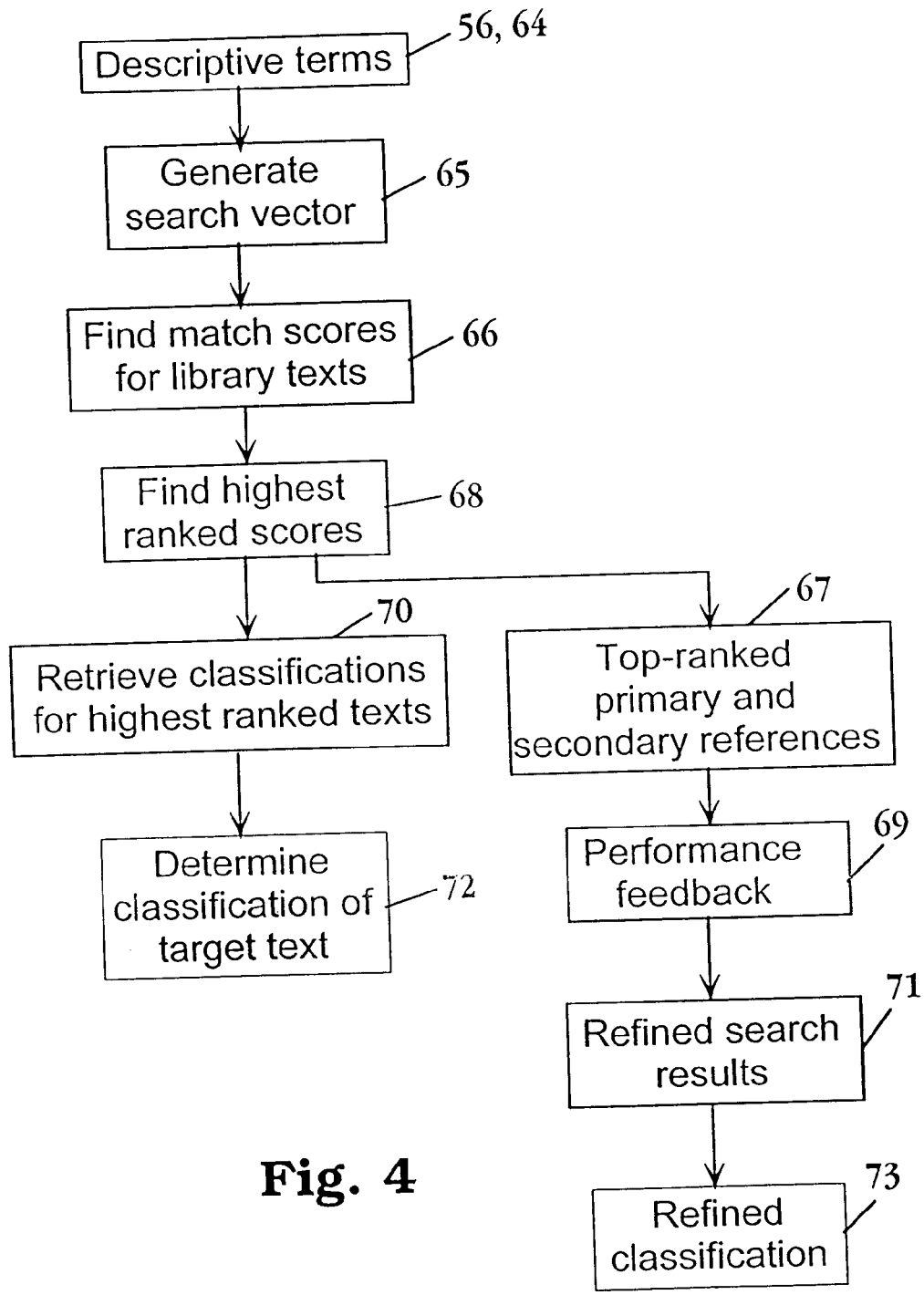
FIG. 4 is an overview flow diagram of various searching and classifying operations that may be carried out by system of the invention.

The text-matching operation is illustrated in overview in FIG. 4, showing the input target-text descriptive terms from files 50, 52 being used to generate a search vector, at 65, which is then used to find texts containing at least one target-text term, indicated at 66, and ranking these texts to identify the sample texts with the highest match scores, as at 68.

Where the system is used for determining text classification, the classifications of the highest-ranking texts are retrieved, as at 70, and these classifications are used in determining a target-text classification, as at 72.

The system may also provide for performance feedback, to enhance the quality of text searching by user input. This general capability is shown at the lower right in FIG. 4. Here a presentation of top-ranked primary and optionally, secondary texts, is made to the user at 67. The user then examines the texts and selects those having the most pertinence to the target text, at 69. The system uses the selected texts to refine the search vector coefficients, re-executes the search, as at 71, and presents the user with a refined search.

The various procedures and system operations outlined above will now be described in detail for each of the system modules.

C. Text Processing

There are two related text-processing operations employed in the system. The first is used in processing each text in one of the N defined-field libraries into a list of words and, optionally, wordpairs that are contained in or derivable from that text. The second is used to process a target text into meaningful search terms, that is, descriptive words, and optionally, wordpairs. Both text-processing operations use the module whose operation is shown in FIG. 5. The text input is indicated generically as a natural language text 75 in FIG. 5.

The first step in the text processing module of the program is to "read" the text for punctuation and other syntactic clues that can be used to parse the text into smaller units, e.g., single sentences, phrases, and more generally, word strings. These steps are represented by parsing function 76 in the module. The design of and steps for the parsing function will be appreciated form the following description of its operation.

For example, if the text is a multi-sentence paragraph, the parsing function will first look for sentence periods. A sentence period should be followed by at least one space, followed by a word that begins with a capital letter, indicating the beginning of a next sentence, or should end the text, if the final sentence in the text. Periods used in abbreviations can be distinguished either from an internal database of common abbreviations and/or by a lack of a capital letter in the word following the abbreviation.

Where the text is a patent claim, the preamble of the claim can be separated from the claim elements by a transition word "comprising" or "consisting" or variants thereof. Individual elements or phrases may be distinguished by semicolons and/or new paragraph markers, and/or element numbers of letters, e.g., 1, 2, 3, or i, ii, iii, or a, b, c.

Where the texts being processed are library texts, and are being processed, for constructing a text database (either as a final database or for constructing a word-record database), the sentences, and non-generic words (discussed below) in each sentence are numbered, so that each non-generic word in a text is uniquely identified by an a TID, an LID, CID, a TID, and one or more word-position identifiers (WPIDs).

In addition to punctuation clues, the parsing algorithm may also use word clues. For example, by parsing at prepositions other than "of", or at transition words, useful word strings can be generated. As will be appreciated below, the parsing algorithm need not be too strict, or particularly complicated, since the purpose is simply to parse a long string of words (the original text) into a series of shorter ones that encompass logical word groups.

After the initial parsing, the program carries out word classification functions, indicated at 78, which operate to classify the words in the text into one of three groups: (i) generic words, (ii) verb and verb-root words, and (iii) remaining groups, i.e., words other than those in groups (i) or (ii), the latter group being heavily represented by non-generic nouns and adjectives.

Generic words are identified from a dictionary 80 of generic words, which include articles, prepositions, conjunctions, and pronouns as well as many noun or verb words that are so generic as to have little or no meaning in terms of describing a particular invention, idea, or event. For example, in the patent or engineering field, the words "device," "method," "apparatus," "member," "system," "means," "identify," "correspond," or "produce" would be considered generic, since the words could apply to inventions or ideas in virtually any field. In operation, the program tests each word in the text against those in dictionary 80, removing those generic words found in the database.

As will be appreciated below, "generic" words that are not identified as such at this stage can be eliminated at a later stage, on the basis of a low selectivity value. Similarly, text words in the database of descriptive words that have a maximum value at of below some given threshold value, e.g., 1.25 or 1.5, could be added to the dictionary of generic words (and removed from the database of descriptive words).

A verb-root word is similarly identified from a dictionary 82 of verbs and verb-root words. This dictionary contains, for each different verb, the various forms in which that verb may appear, e.g., present tense singular and plural, past tense singular and plural, past participle, infinitive, gerund, adverb, and noun, adjectival or adverbial forms of verb-root words, such as announcement (announce), intention (intend), operation (operate), operable (operate), and the like. With this database, every form of a word having a verb root can be identified and associated with the main root, for example, the infinitive form (present tense singular) of the verb. The verb-root words included in the dictionary are readily assembled from the texts in a library of texts, or from common lists of verbs, building up the list of verb roots with additional texts until substantially all verb-root words have been identified. The size of the verb dictionary for technical abstracts will typically be between 500–1,500 words, depending on the verb frequency that is selected for inclusion in the dictionary. Once assembled, the verb dictionary may be culled to remove words in generic verb words, so that words in a text are classified either as generic or verb-root, but not both.

In addition, the verb dictionary may include synonyms, typically verb-root synonyms, for some or all of the entries in the dictionary. The synonyms may be selected from a standard synonyms dictionary, or may be assembled based on the particular subject matter being classified. For example, in patent/technical areas, verb meanings may be grouped according to function in one or more of the specific technical fields in which the words tend to appear. As an example, the following synonym entries are based a general action and subgrouped according to the object of that action:
 create/generate,
  assemble, build, produce, create, gather, collect, make, generate, create, propagate,
  build, assemble, construct, manufacture, fabricate, design, erect, prefabricate,
  produce, create,
  replicate, transcribe, reproduce, clone, reproduce, propagate, yield, produce, create,
  synthesize, make, yield, prepare, translate, form, polymerize,
 join/attach,
  attach, link, join, connect, append, couple, associate, add, sum, concatenate, insert,
  attach, affix, bond, connect, adjoin, adhere, append, cement, clamp, pin, rivet, sew,
   solder, weld, tether, thread, unify, fasten, fuse, gather, glue, integrate,
   interconnect, link, add, hold, secure, insert, unite, link, support, hang, hinge, hold,
   immobilize, interconnect, interlace, interlock, interpolate, mount, support),
  derivatize, couple, join, attach, append, bond, connect, concatenate, add, link, tether,
   anchor, insert, unite, polymerize,
  couple, join, grip, splice, insert, graft, implant, ligate, polymerize, attach As will be seen below, verb synonyms are accessed from a dictionary as part of the text-searching process, to include verb and verb-word synonyms in the text search.

The words remaining after identifying generic and verb-root words are for the most part non-generic noun and adjectives or adjectival words. These words form a third general class of words in a processed text. A dictionary of synonyms may be supplied here as well, or synonyms may be assigned to certain words on as as-needed basis, i.e., during classification operations, and stored in a dictionary for use during text processing. The program creates a list 50 of non-generic words that will accumulate various types of word identifier information in the course of program operation.

The parsing and word classification operations above produce distilled sentences, as at 84, corresponding to text sentences from which generic words have been removed. The distilled sentences may include parsing codes that indicate how the distilled sentences will be further parsed into smaller word strings, based on preposition or other generic-word clues used in the original operation. As an example of the above text parsing and word-classification operations, consider the processing of the following patent-claim text into phrases (separate paragraphs), and the classification of the text words into generic words (normal font), verb-root words (italics) and remainder words (bold type).

A device for monitoring heart rhythms, comprising:
means for storing digitized electrogram segments including signals indicative of depolarizations of a chamber or chamber of a patient's heart;
means for transforming the digitized signals into signal wavelet coefficients;
means for identifying higher amplitude ones of the signal wavelet coefficients; and
means for generating a match metric corresponding to the higher amplitude ones of the signal wavelet coefficients and a corresponding set of template wavelet coefficients derived from signals indicative of a heart depolarization of known type, and
identifying the heart rhythms in response to the match metric.

The parsed phrases may be further parsed at all prepositions other than "of". When this is done, and generic words are removed, the program generates the following strings of non-generic verb and noun words.

monitoring heart rhythms
storing digitized electrogram segments
signals depolarizations chamber patient's heart
transforming digitized signals
signal wavelet coefficients
amplitude signal wavelet coefficients
match metric
amplitude signal wavelet coefficients
template wavelet coefficients//
signals heart depolarization
heart rhythms
match metric.

Figure 5:
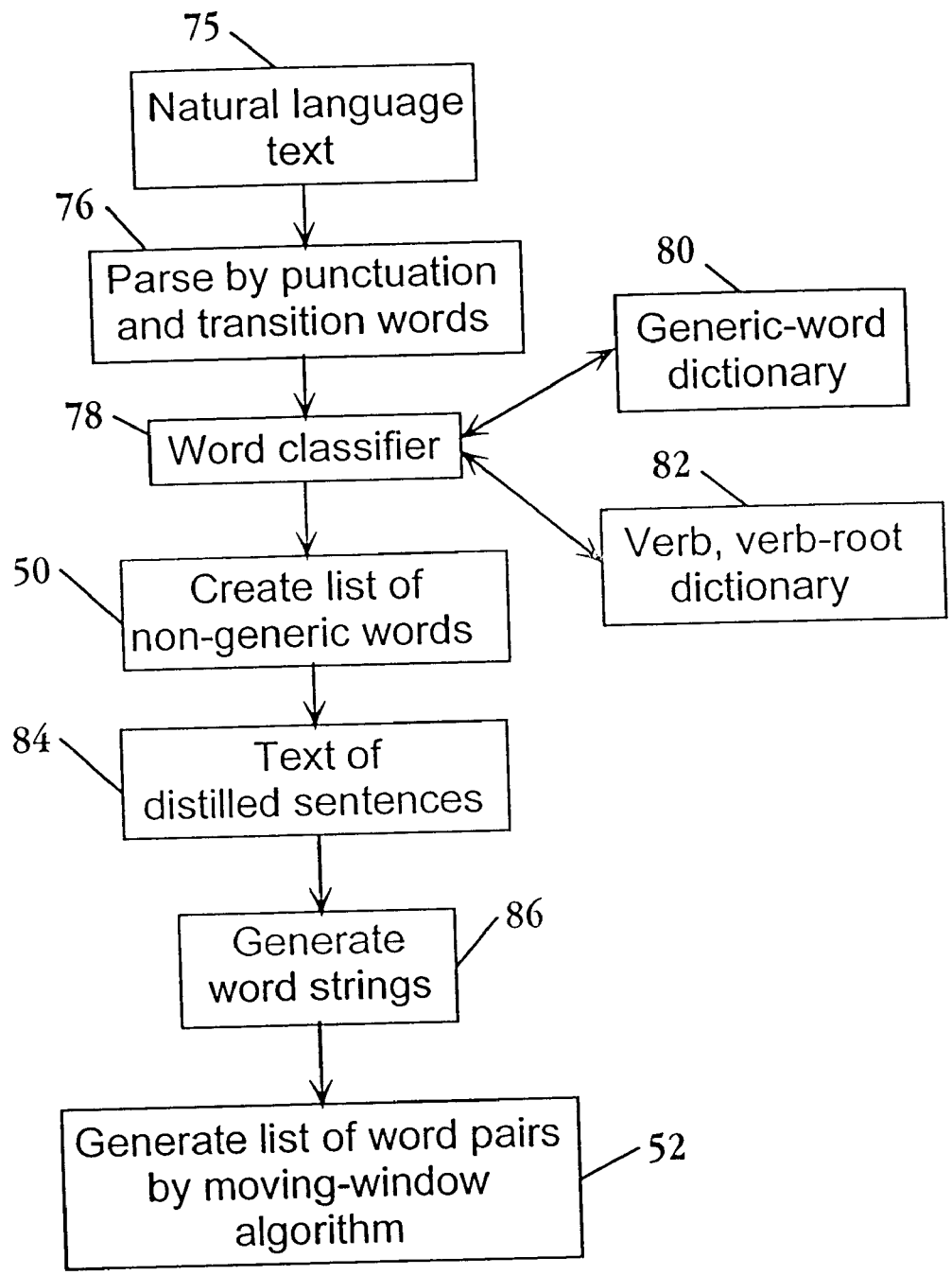
FIG. 5 is a flow diagram of the system operations for processing a digitally encoded text to generate non-generic words and wordpairs.

The operation for generating words strings of non-generic words is indicated at 86 in FIG. 5, and generally includes the above steps of removing generic words, and parsing the remaining text at natural punctuation or other syntactic cues, and/or at certain transition words, such as prepositions other than "of."

The word strings may be used to generate word groups, typically pairs of proximately arranged words. This may be done, for example, by constructing every permutation of two words contained in each string. One suitable approach that limits the total number of pairs generated is a moving window algorithm, applied separately to each word string, and indicated at 88 in the figure. The overall rules governing the algorithm, for a moving "three-word" window, are as follows:

1. consider the first word(s) in a string. If the string contains only one word, no pair is generated;
2. if the string contains only two words, a single two-wordpair is formed;
3. If the string contains only three words, form the three permutations of wordpairs, i.e., first and second word, first and third word, and second and third word;
4. if the string contains more than three words, treat the first three words as a three-word string to generate three two-words pairs; then move the window to the right by one word, and treat the three words now in the window (words 2–4 in the string) as the next three-word string, generating two additional wordpairs (the wordpair formed by the second and third words in preceding group will be the same as the first two words in the present group) string;
5. continue to move the window along the string, one word at a time, until the end of the word string is reached.

For example, when this algorithm is applied to the word string: store digitize electrogram segment, it generates the wordpairs: store-digitize, store-electrogram, digitize-electrogram, digitize-segment, electrogram-segment, where the verb-root words are expressed in their singular, present-tense form and all nouns are in the singular. The non-generic word.

The word pairs are stored in a list 52 which, like list 50, will accumulate various types of identifier information in the course of system operation, as will be described below.

Where the text-processing module is used to generate a text database of processed texts, as described below with reference to FIG. 6, the module generates, for each text a record that includes non-generic words and, optionally, word groups derived from the text, the text identifier, and associated library and classification identifiers, and WPIDs.

D. Generating Text and Word-Records Databases

The database in the system of the invention contains text and identifier information used for one or more of (i) determining selectivity values of text terms, (ii) identifying texts with highest target-text match scores, and (iii) determining target-text classification. Typically, the database is also used in identifying target-text word groups present in the database texts.

The texts in the database that are used for steps (ii) and (iii), that is, the texts against which the target text is compared, are called "sample texts." The texts that are used in determining selectivity values of target terms are referred to as "library texts," since the selectivity values are calculated using texts from two or more different libraries. In the usual case, the sample texts are the same as the library texts. Although less desirable, it is nonetheless possible in practicing the invention to calculate selectivity values from a collection of library texts, and apply these values to corresponding terms present in the sample texts, for purposes of identifying highest-matching texts and classifications. Similarly, IDFs may be calculated from library texts, for use in searching sample texts.

The texts used in constructing the database typically include, at a minimum, a natural-language text that describes or summarizes the subject matter of the text, a text identifier, a library identifier (where the database is used in determining term selectivity values), and a classification identifier that identifies a pre-assigned classification of that subject matter. Below are considered some types of libraries of texts suitable for databases in the invention, in making the following types of document classification:

Patent classification. The texts for this database include libraries of different-field patent texts, where the classification identifier includes at least one patent class and, optionally, at least one patent subclass. For example, the libraries used in the construction of the database employed in Examples 1 And 2 are made up of texts from a US patent bibliographic databases containing information about selected-filed US patents, including an abstract patent, issued between 1976 and 2000. This patent-abstract database can be viewed as a collection of libraries, each of which contains text from a particular, field. In the method described in the examples, the patent database was used to assemble six different-field libraries containing abstracts from the following U.S. patent classes (identified by CID);

I. Chemistry, classes 8, 23, 34, 55, 95, 96, 122, 156, 159, 196, 201, 202, 203, 204, 205, 208, 210, 261, 376, 419, 422, 423, 429, 430, 502, 516;

II Surgery, classes, 128, 351, 378, 433, 600, 601, 602, 604, 606, 623;

III. Non-surgery life science, classes 47, 424, 435, 436, 504, 514, 800, 930;

IV. Electricity classes, 60, 136, 174, 191, 200, 218, 307, 313, 314, 315, 318, 320, 322, 323, 324, 335, 337, 338, 361, 363, 388, 392, 439;

V. Electronics/communication, classes 178, 257, 310, 326, 327, 329, 330, 331, 322, 333, 334, 336, 340, 341, 342, 343, 348, 367, 370, 375, 377, 379, 380, 381, 385, 386, 438, 455, and VI. Computers/software, classes. 345, 360, 365, 369, 382, 700, 701, 702, 703, 704, 705, 706, 707, 708, 709, 710, 711, 712, 713, 714, 716, 717, 725.

Grant proposal classification. The texts used for constructing this database include large numbers of grant proposals, e.g., grant proposals from earlier submission periods, classified according to subject mater or according to internal work-study units used in evaluating grants in different areas. The libraries of texts might include a separate library for each separate classification, or multiple classifications within a single library, as is the case for the patent libraries above. The texts themselves are preferably grant summaries of the subject matter and purpose of submitted proposal.

Legal cases classification. It is desirable, when publishing appellate cases or other legal document, to classify the case according to the legal principles or categories that are dominant in any particular case. In particular, it is desirable to identify from the head notes of a case, the particular area of legal classification of a case, e.g., the legal doctrine of principles held in that case. Here the texts used in constructing the database are head notes or case summaries, the different libraries are general legal areas, e.g., torts, real property, criminal law, etc, and the classification is the legal principle or holding brought out in the case.

Classification of technical publication. In many technical or scientific fields, publications in the field are assembled for reference purposes in abstract compendia, such as Biological Abstracts, Chemical Abstracts, and the like. Typically, these are arranged or at least indicated by subject matter, which represent classifications into one or more of several specialities within a field. Here the texts used for database construction are abstracts of the publications, and the libraries are either the different specialities in the filed corresponding to the different classifications within the field, or collections of related classifications within the field. The method of the invention can also use this type of database for directing new publication submissions to the proper editorial group for review.

Figure 6:
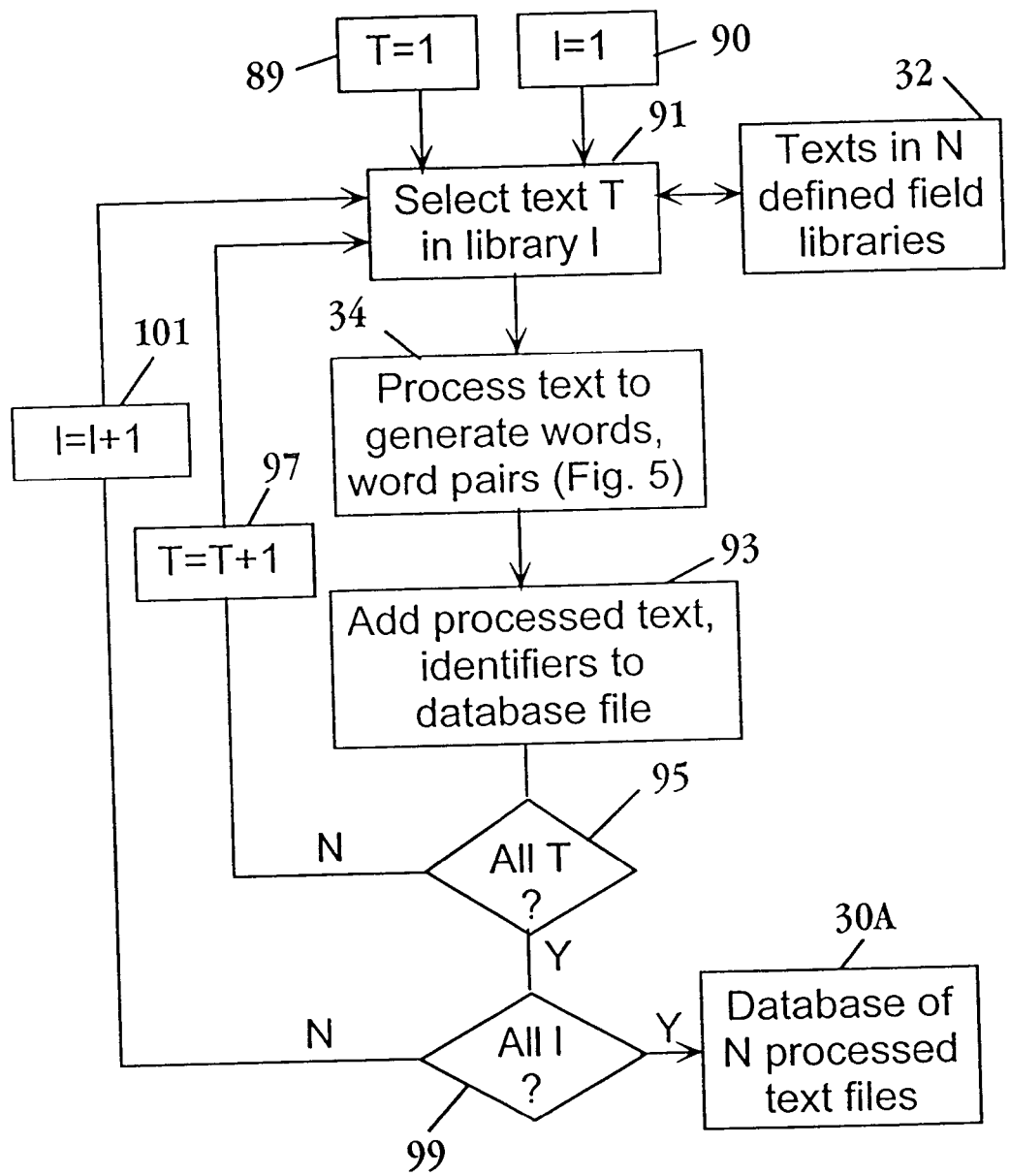
FIG. 6 is a flow diagram of steps performed in generating a database of N library text files.

The basic program operations used in generating a text database of processed texts is illustrated in FIG. 6. The program processes some large number L of texts, e.g., 5,000 to 500–000 texts from each of N libraries. In the flow diagram, "T" represents a text number, beginning with the first text in the first library and ending with the Lth processed text in the Nth library. The text number T is initialized at 1 (box 89), the library number I at 1 (box 90), and text T is then retrieved from the collection of library texts 32 (box 91). That text is then processed at 34, as above, to yield a list of non-generic words and wordpairs. To this list is added the text identifier and associated library and classification identifiers. This processing is repeated for all texts in library I, through the logic of 95 and 97, to generate a complete text file for library I. All of the texts in each successive library are then processed similarly, though the logic of 99, 101, to generate N text files in the database.

Although not shown here, the program operations for generating a text database may additionally include steps for calculating selectivity values for all words, and optionally wordpairs in the database files, where one or more selectivity values are assigned to each word, and optionally word-pair in the processed database texts.

FIG. 6 is a flow diagram of program operation for generating a text database 30A using texts 32 in N defined-field libraries. The program is initialized to text T=1, at 89, and I (library)=1 at 90, then selects text T in library I. This text is processed at 34, as described above to produce a list of words, and optionally word pairs. The processed text and identifiers are then added to the database file, as at 93. As noted above, the identifiers for each text include the TID, CID, LID, and for each text word, the WPIDs. This process is repeated for each text T in library I, through the logic of 95, 97, and then for each text T in each additional library I, through the logic of 99, 101, to produce the database 30A.

Figure 7:
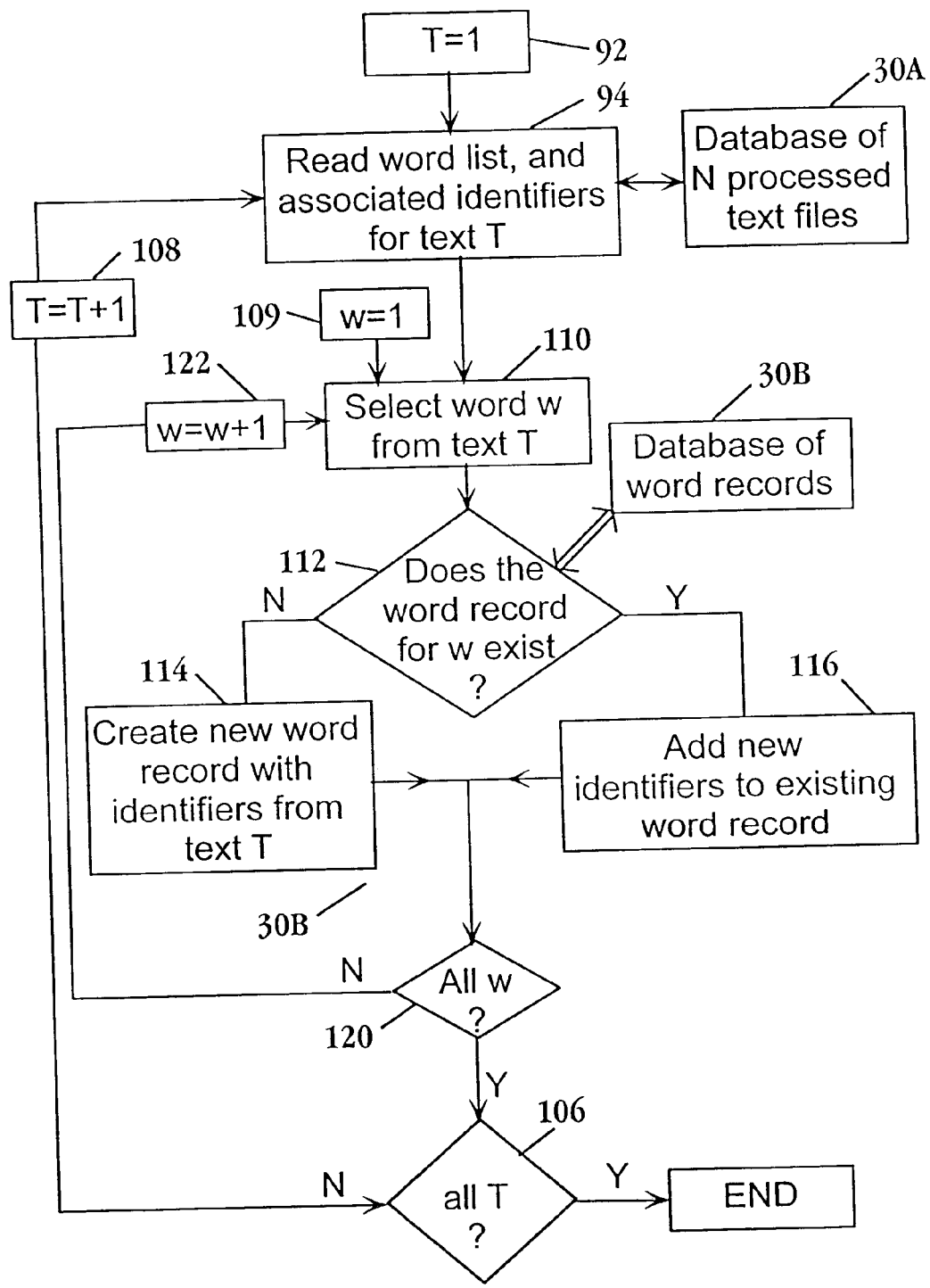
FIG. 7 is a flow diagram of steps performed in generating a word-records database.

FIG. 7 is a flow diagram of program operations for constructing a word-records database 30B from text database 30A. The program initialize text T at 1, (box 92), then reads the word list and associated identifiers for text T from database 30A. The text word list is initialized word w=1 at 109, and the program selects this word w at 110. During the operation of the program, a database of word records 30B begin to fill with word records, as each new text is processed. This is done, for each selected word w in text T, of accessing the word records database, and asking: is the word already in the database, as at 112. If it is, the word record identifiers for word w in text T are added to the existing word record, as at 116. If not, the program creates a new word record with identifiers from text T at 114. This process is repeated until all words in text T have been processed, according to the logic of 120, 122, then repeated for each text, through the logic of 106, 108.

When all texts in all N libraries have been so processed, the database contains a separate word record for each non-generic word found in at least one of the texts, and for each word, a list of TIDs, CIDs, and LIDs identifying the text(s) and associated classes and libraries containing that word, and for each TID, associated WPIDs identifying the word position(s) of that word in a given text.

Figure 8:
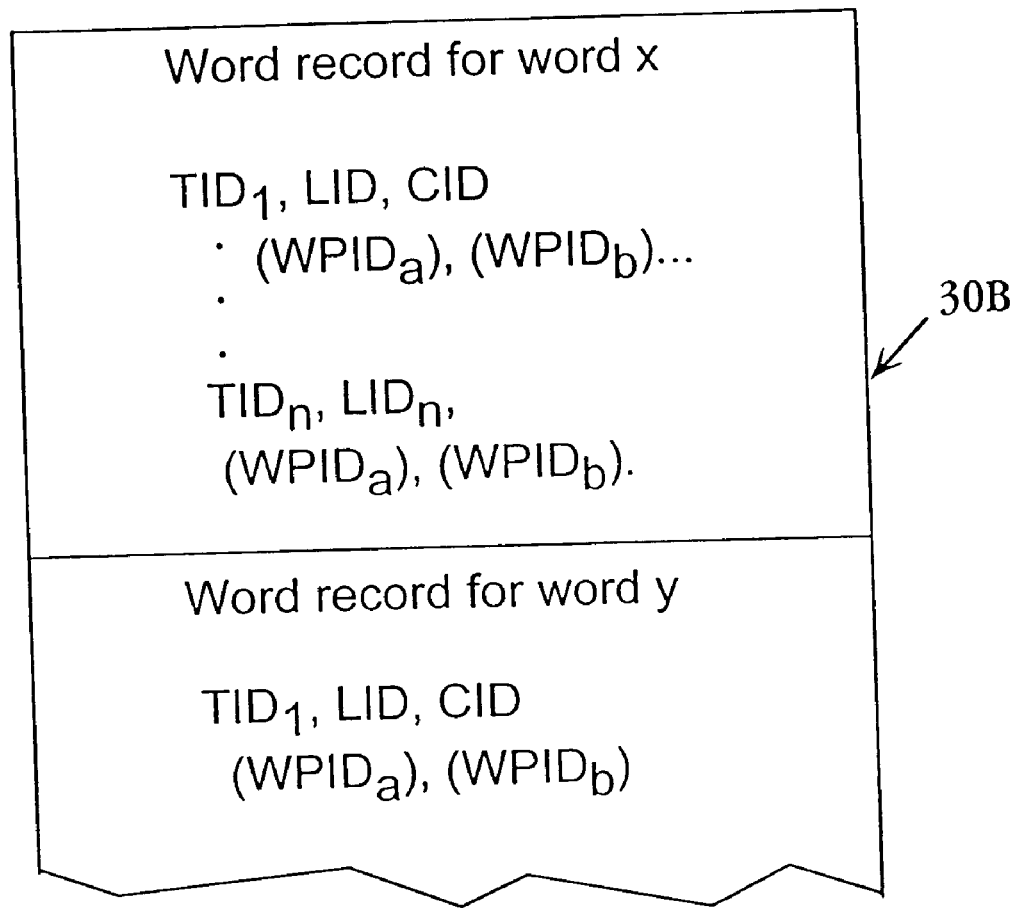
FIG. 8 illustrates a portion of two word records in a representative word-records database.

FIG. 8 shows a pair of word records, identified as "word-x" and "word-y," in a word record 30B constructed in accordance with the invention. Associated with each word are one or more TIDs, for each TID, the associated LID, CID, and WPIDs. As shown the word record for word x includes a total of n TIDs. A word record in the database may further include other information, such as SVs and IDFs, although as will be appreciated below, these values are readily calculated from the TID and LID identifiers in each record.

E. Determining Selectivity Values.

The present invention is intended to provide a separate selectivity value for each of the two or more different text libraries that are utilized, that is, text libraries representing texts from two or more different fields or with different classifications. The selectivity value that is used in constructing a search vector may be the selectivity value representing one of the two or more preselected libraries of text, that is, libraries representing one or more preselected fields. More typically, however, the selectivity value that is utilized for a given word or wordpair is the highest selectivity value determined for all of the libraries. It will be recalled that the selectivity value of a term indicates its relative importance in texts in one field, with respect to one or more other fields, that is, the term is descriptive in at least one field. By taking the highest selectivity value for any term, the program is in essence selecting a term as "descriptive" of text subject matter if is descriptive in any of the different text libraries (fields) used to generate the selectivity values. It is useful to select the highest calculated selectivity value for a term (or a numerical average of the highest values) in order not to bias the program search results toward any of the several libraries of texts that are being searched. However, once an initial classification has been performed, it may be of value to refine the classification procedure using the selectivity values only for that library containing texts with the initial classification.

E1. Calculating Selectivity Values and Text Searching Using a Text Database

Figure 9A:
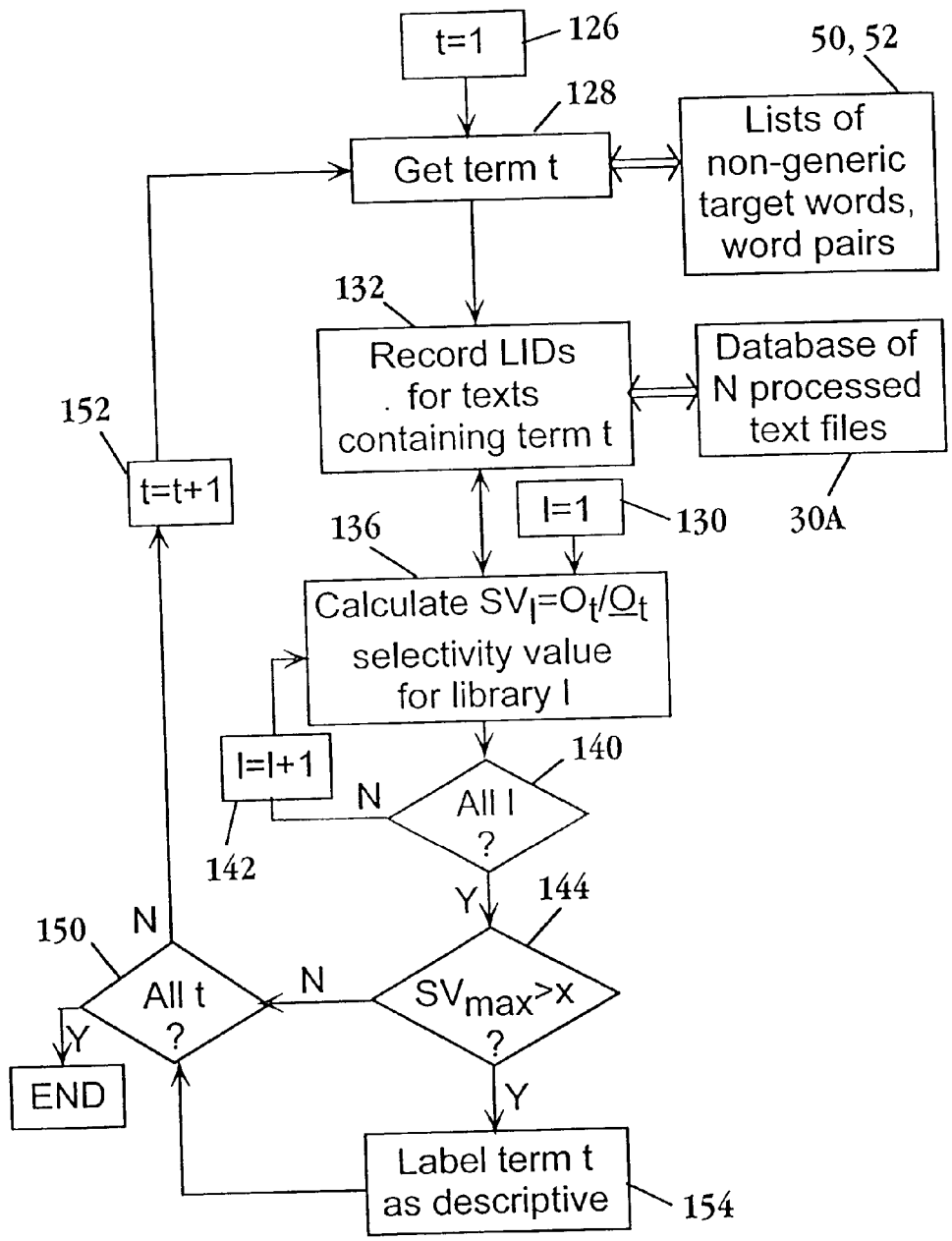
FIG. 9 is a flow diagram of system operations for generating, from N processed text files, a list of target terms with associated selectivity values (SVs), inverse and text identifiers.

FIG. 9A is a flow diagram of steps executed in calculating selectivity values using a text database. In particular, the steps in this flow diagram are intended to (i) examine each of the non-generic words and wordpairs extracted from a target terms lists (files 50, 52), (ii) calculate selectivity values for each of the terms, and (iii) mark that term as a descriptive term if at least one of its selectivity values is above a selected threshold (which may be different for words and wordpairs).

The program is initialized at term value t=1 (box 126), meaning the first term in the list of target-text non-generic words and wordpairs (files 50, 52). The program then searches all the processed texts in text database 30A, recording the text TIDs and associated LIDs and CIDs for each text containing that term, as indicated at 132. Initializing to library I=1 (box 130), the associated selectivity value $S_I = O_t$, for that term is then calculated at 136 as the frequency of occurrence of that term in library I ($O_t$) divided by the frequency of occurrence of the same term in all other libraries $\underline{I}(\underline{O}_t)$. The frequency of occurrence $O_t$ or $\underline{O}_t$, of a term in a library or group of libraries is calculated either as the total number of texts containing a term divided by the total size of the library or libraries interrogated, or as the frequency of term in a library up to some preselected number of texts, e.g., 50K texts. As an example of the first approach, assume there are 125 texts containing that term out of a total of 100,000 texts in library I, and 150 texts containing that term in all other libraries, out of a total of 500,000 texts in all $\underline{I}$ libraries. The frequency of occurrence of the term in library I is thus 125/100,000 and in libraries $\underline{I}$, 150/500,000. The selectivity value calculated would then be 4.16. Although not shown here, the program may increment a zero value of $\underline{O}_t$, to one or some other small number, to maintain the selectivity value as a finite number.

The selectivity value is similarly calculated for each additional library, through the logic of 140, 142, until all N-library the selectivity values for term t are calculated. Once this process is complete, the program examines all N selectivity values at box 144 to determine whether at least one of the values $S_{max}$ is above ve a given threshold selectivity value x, e.g., a value between 1.5 and 3. If negative, the program ignores that term, and proceeds to the next term, through the logic of 144, 150, and 152. If positive, the program marks the term in list 50 or 52 as a descriptive term and records the corresponding selectivity value. This process is repeated for each target-text term, through the logic of 150, 152, until all of the texts have been considered. The output file contains a list 154 of all target-text terms and their corresponding selectivity values.

Figure 9B:
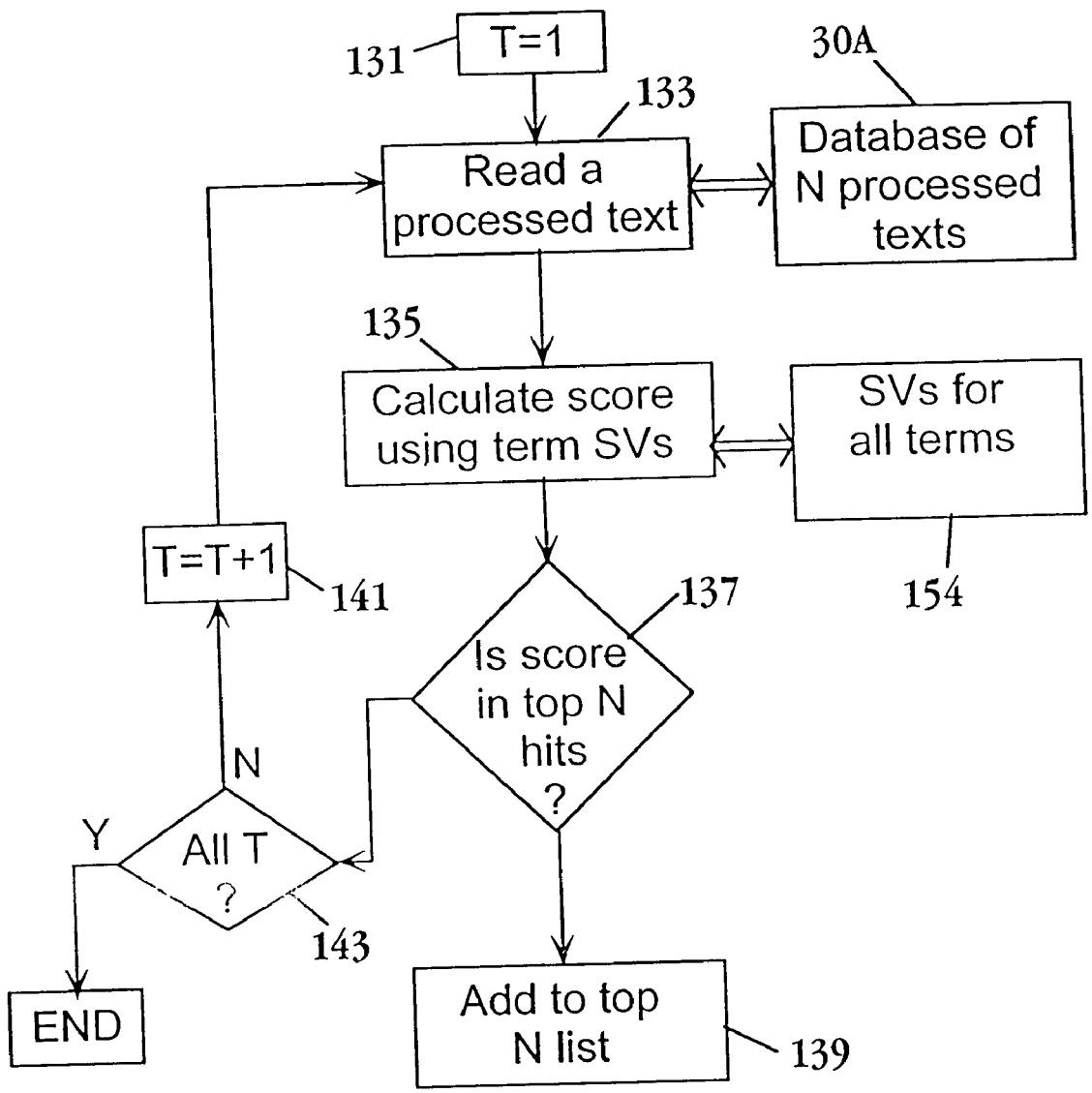

FIG. 9B shows how the texts in database 30A may be searched for term overlap with the target-text terms. Briefly, each text T in the database, beginning from an initialized value of 1 at 131 is retrieved from the database at 133. The processed text from the database, it will be recalled includes a list of all non-generic words and word pairs in that text. The program checks each word and wordpair against the list of target-text words and word pairs. When a term match is found, the program records the match and adds the selectivity value of that term to a rolling sum of values, ultimately calculating an overall match score at 135. It will be appreciated below that (i) the selectivity value used is a selectivity value function, and in the case or word terms, the match score may additionally be weighted by the word's IDF. After calculating a final match score for that text, the program asks, at 137, whether the text score is in the top N hits. If it is not, the program continues, through the logic of 143, 141, to the next text. If it is, the text is added to the list of top N scores at 139.

Figure 10:
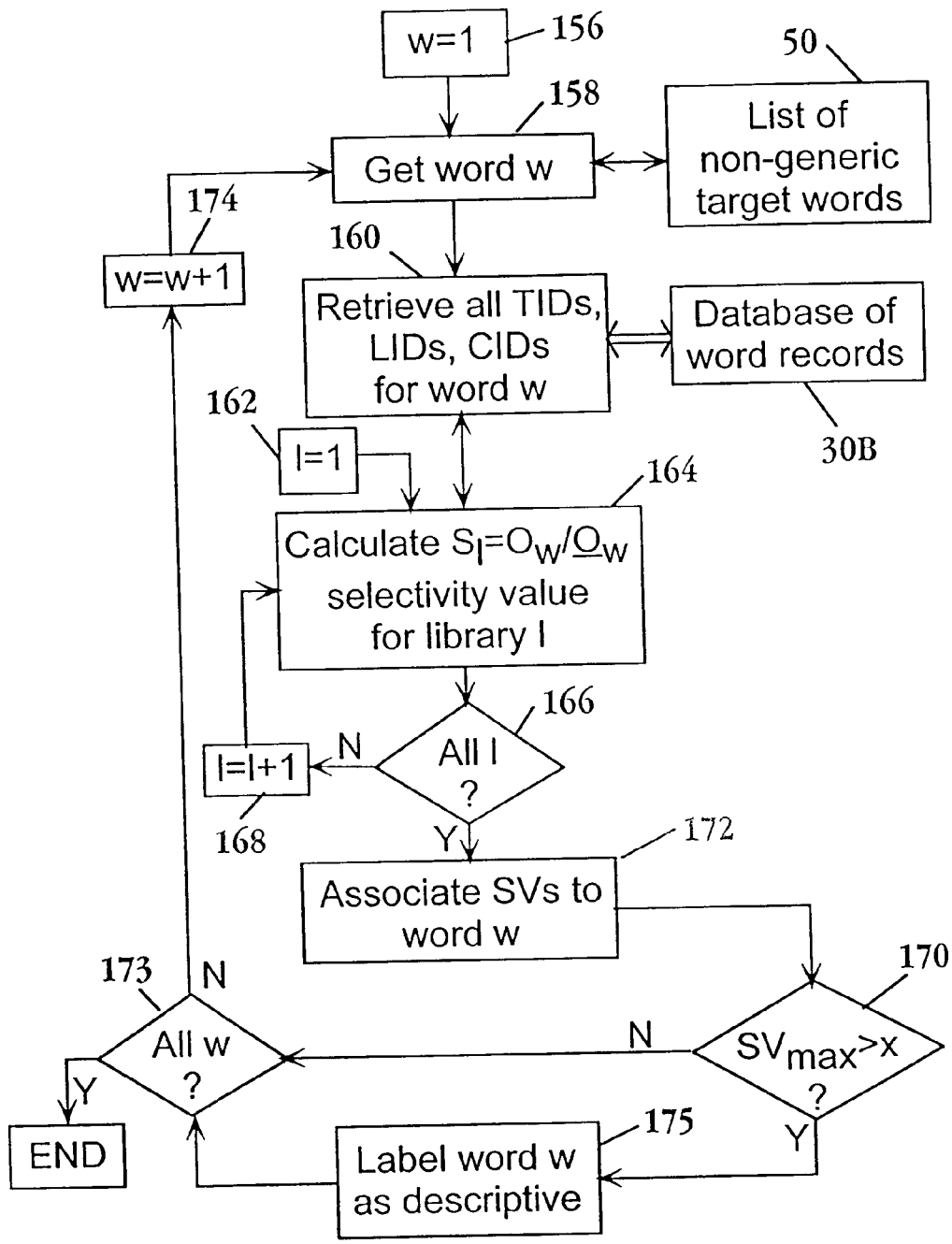
FIG. 10 is a flow diagram of system operations for generating, from a word-records database, a list of target words with associated selectivity values (SVs), and identifiers.

E2. Calculating Selectivity Values Using a Word-Records Database

Where the system employs a words-record database, the operations involved in calculating word selectivity values are somewhat different from those used in calculating word-pair selectivity values, and these will be described separately with respect to FIG. 10 and FIGS. 11A and 11B, respectively. Looking first at FIG. 10, the program is initialized at 156 to the first target text word w, and this word is retrieved at 158 from the list 50 of target-text words. The program retrieves all TIDs, LIDs, and CIDs for this word in database 30B. To calculate the selectivity value for each of the N libraries, the program initializes to I=1 at 162, and counts all TIDs whose LID corresponds to I=1 and all TIDs whose LIDs correspond to all other libraries. From these numbers, and knowing the total number of texts in each libraries, the occurrence of word w in libraries I and $\underline{I}$, respectively ($O_w$ and $\underline{O}_w$) is determined, and the selectivity value calculated as $S_I = O_w / \underline{O}_w$ as indicated at 164. This calculation is repeated for each library, through the logic of 166, 168, until all N selectivity values are calculated. These values are then attached to the associated word in word list 50, as indicated at 172. The highest of these values, $S_{max}$, is then tested against a threshold value, as at 172. If the $S_{max}$ is greater than a selected threshold value x, the program marks the word in list 50 as descriptive, as at 175. This process is repeated for all words in list 50, through the logic of 173, 174, until all of the words have been processed.

Figure 11A:
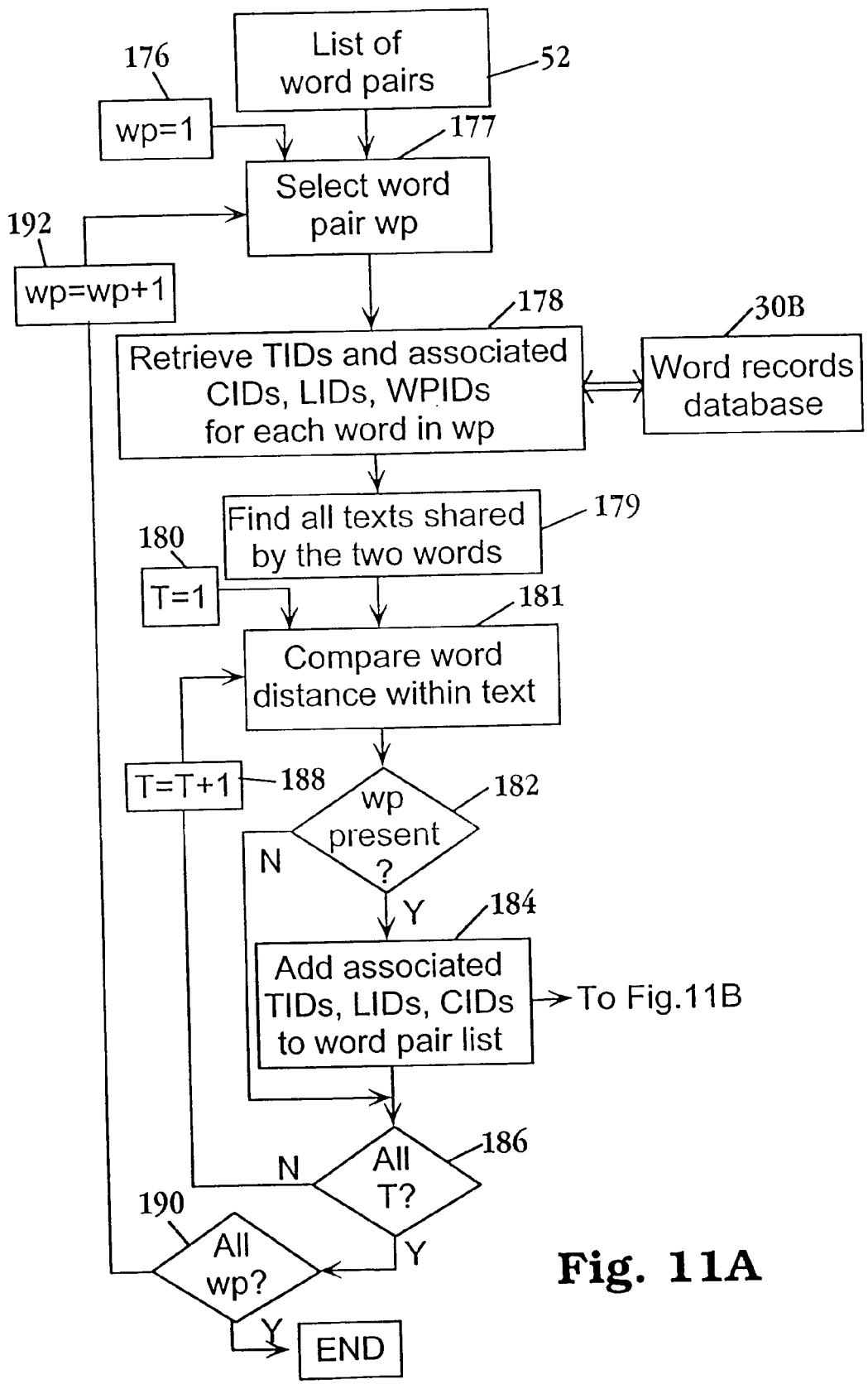
FIGS. 11A and 11B are flow diagrams of system operations for generating, from the list of target words and associated a word-records from FIG. 10, a list of target word pairs and associated selectivity values and text identifiers.
Figure 11B:
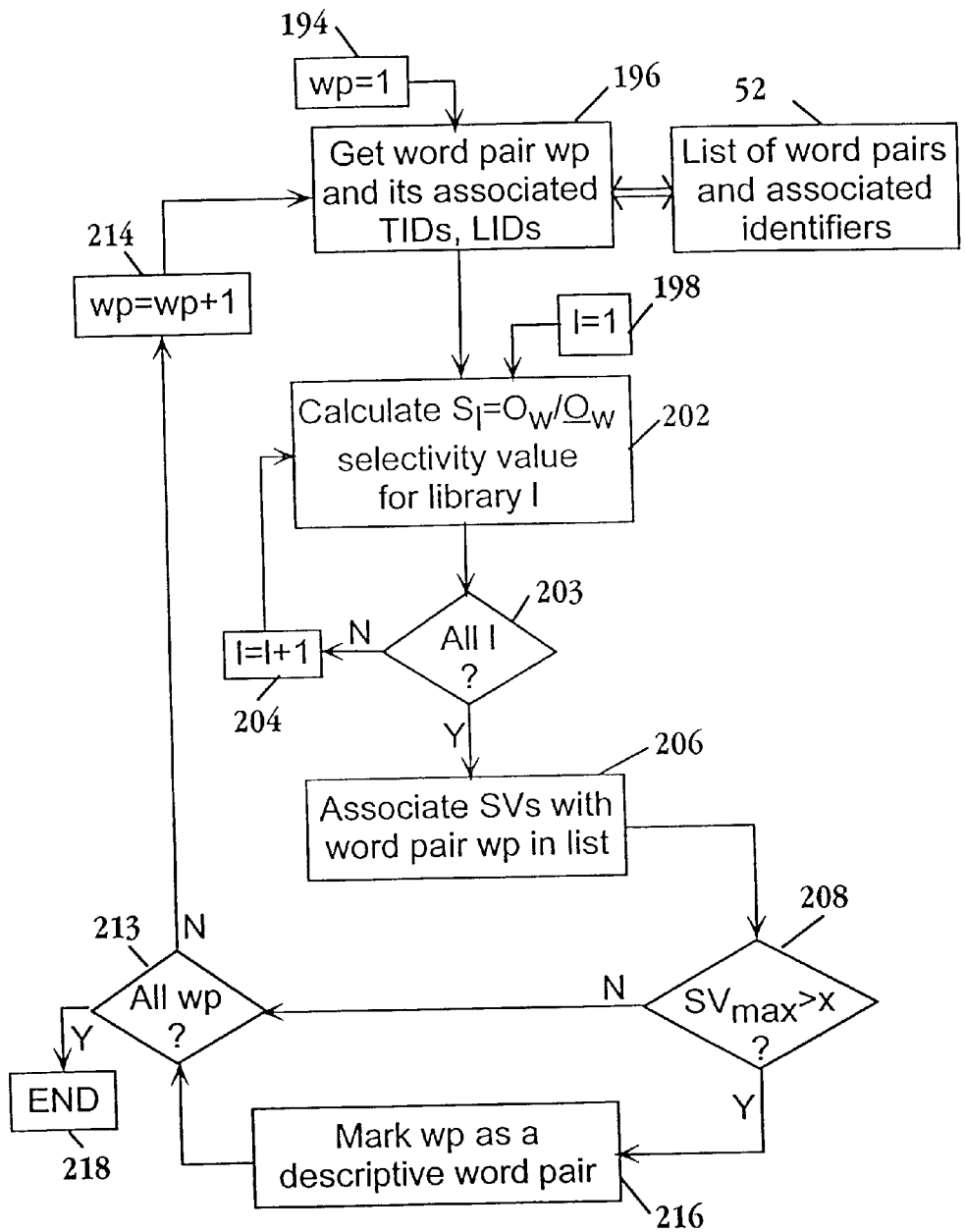

The program operations for calculating wordpair selectivity values are shown in FIGS. 11A and 11B. As seen in FIG. 11A, the wordpairs are initialized to 1 (box 176) and the first wordpair is selected from file 52, as at 177. The program accesses word-records database 30B to retrieve TIDs containing each word in the wordpair, and for each TID, associated WPIDs and LIDs. The TIDs associated with each word in a word pair are then compared at 179 to identify all TIDs containing both words. For each of these "common-word" texts T, the WPIDs for that text are compared to determine the word distance between the words in the word pair in that text. Thus, for example, if the two words in a wordpair in text T have WPIDs "2–4" and "2–6" (identifying word positions corresponding to distilled sentence 2, words 4 and 6), the text would be identified as one having that wordpair. Conversely, if no pair of WPIDs in a text T corresponded to adjacent words, the text would be ignored.

If a wordpair is present in a given text (box 182), the TIDs, LID, and CIDs for that word pair are added to the associated wordpair in list 52, as at 184. This process is repeated, through the logic of 186, 188, until all texts T containing both words of a given wordpair are interrogated for the presence of the wordpair. For each wordpair, the process is repeated, through the logic of 190, 192, until all non-generic target-text wordpairs have been considered. At this point, list 52 contains, for that wordpairs in the list, all TIDs associated with each wordpair, and the associated LIDs and CIDs.

The program operation to determine the selectivity value of each wordpair is similar to that used in calculating word selectivity values. With reference to FIG. 11B, the wordpair value "wp" is initialized at 1 (box 194), and the first wp, with its recorded TIDs and LIDs, is retrieved from list 52 (box 196). To calculate the selectivity value for each of the N libraries, the program initializes to library I=1 at 198, and counts all TIDs whose LID corresponds to I=1 and all TIDs whose LIDs correspond to all other libraries. From these numbers, and knowing the total number of texts in each libraries, the occurrence of wordpair wp in libraries I and Ī, respectively ($O_{wp}$ and $Q_{wp}$) is determined, and the selectivity value $S_I$ calculated as $O_{wp}/Qwp$ as indicated at 202. This calculation is repeated for each library, through the logic of 203, 204, until selectivity values for all N libraries are calculated. These values are then added to the associated word pair in list 52.

The program now examines the highest selectivity values $S_{max}$ to determine whether if this value is above a given threshold selectivity value, as at 208. If negative, the program proceeds to the next word, through the logic of 213, 214. If positive, the program marks the word pair as a descriptive word pair, at 216. This process is repeated for each target-text wordpair, through the logic of 213, 214. When all terms have been processed, the program contains a file 52 of each target-text wordpair, and for each wordpair, associated SVs, text identifiers for each text containing that wordpair, and associated CIDs for the texts.

F. Generating a Search Vector

This section considers the operation of the system in generating a vector representation of the target text, in accordance with the invention. As will be seen the vector is used for various text manipulation and comparison operations, in particular, finding texts in a text database that have high term overlap with the target text.

The vector is composed of a plurality non-generic words and, optionally, proximately arranged word groups in the document. Each term has an assigned coefficient which includes a function of the selectivity value of that term. Preferably the coefficient assigned to each word in the vector is also related to the inverse document frequency of that word in one or more of the libraries of texts. A preferred coefficient for word terms is a product of a selectivity value function of the word, e.g., a root function, and an inverse document frequency of the word. A preferred coefficient for wordpair terms is a function of the selectivity value of the word pair, preferably corrected for word IDF values, as will be discussed. The word terms may include all non-generic words, or preferably, only words having a selectivity value above a selected threshold, that is, only descriptive words.

Figure 12A:
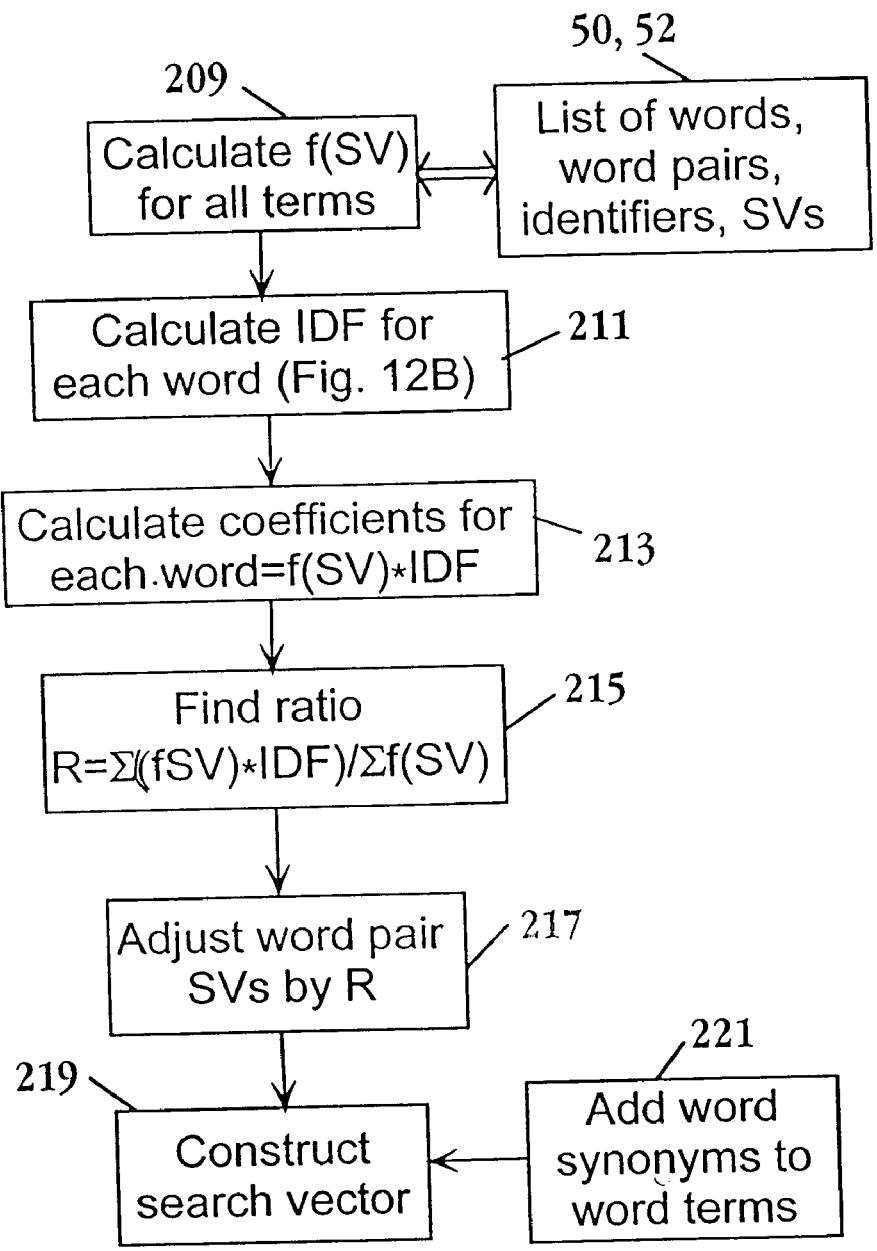
FIG. 12A is a flow diagram of system operations for calculating word inverse document frequencies (IDFs) for target words, and for generating a word-string vector representation of a target text.
Figure 12B:
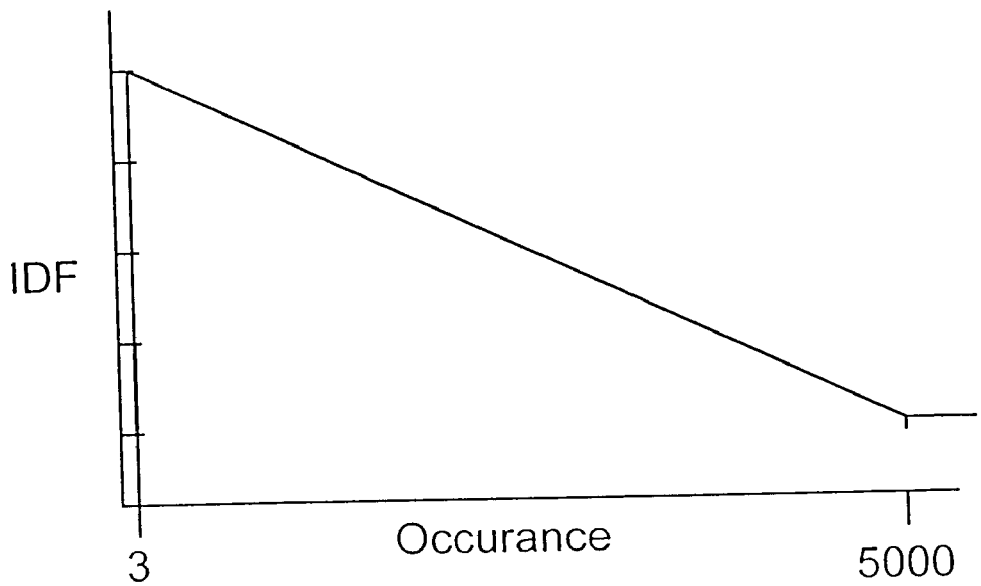
FIG. 12B shows an exemplary IDF function used in calculating word IDF values.
Figure 12C:
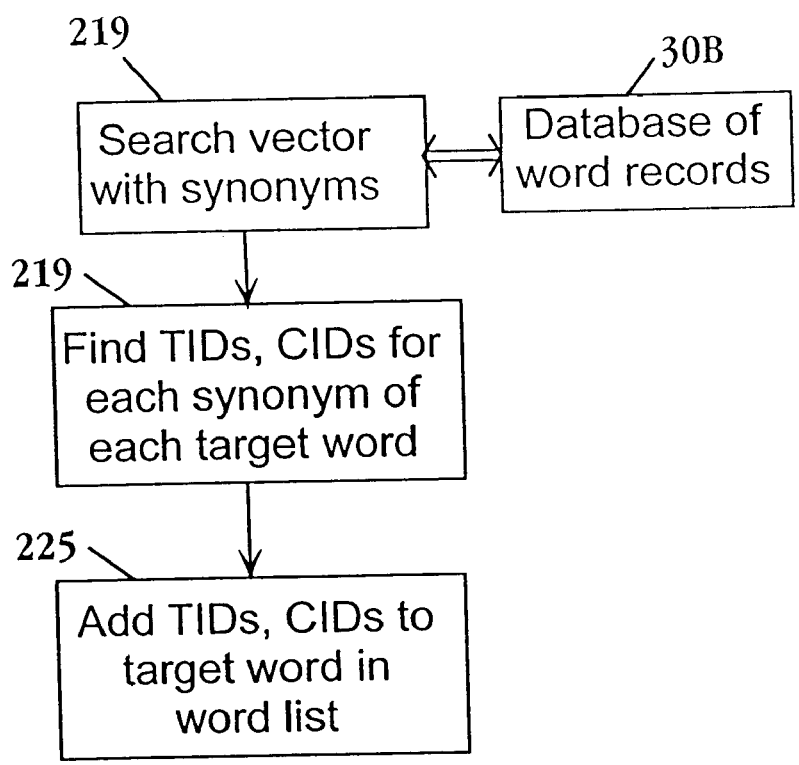

The operation of the system in constructing the search vector is illustrated in FIGS. 12A and 12C. Referring to FIG. 12A. the system first calculates at 209 a function of the selectivity value for each term in the list of terms 50, 52. As indicated above, this list contains the selectivity values, or at least the maximum selectivity value for each word in list 50 and each wordpair in list 52. The function that is applied is preferably a root function, typically a root function between 2 (square root) and 3 (cube root). An exemplary root function of 2.5 was determined using classification data given in Example 1. The same function may be applied to word pairs.

Where the vector word terms include an IDF component, this value is calculated conventionally at 211 using an inverse frequency function, such as the one shown in FIG. 12B. This particular function has a zero value for a document frequency (occurrence) of less than 3, decreases linearly between 1 and 0.2 over a document frequency range of 3 to 5,000, then assumes a constant value of 0.2 for document frequencies of greater than 5,000. The document frequency employed in this function is the total number of documents containing a particular word or word pair in all of texts associated with a particular word or word group in lists 50, 52, respectively, that is, the total number of TIDs associated with a given word or word group in the lists. The coefficient for each word term is now calculated from the selectivity value function and IDF. As shown at 213, an exemplary word coefficient is the product of the selectivity value function and the IDF for that word.

IDFs are typically not calculated for word pairs, due to the generally low number of word pair occurrences. However, the word pair coefficients may be adjusted to compensate for the overall effect of IDF values on the word terms. As one exemplary method, the operation at 215 shows the calculation of an adjustment ratio R which is the sum of the word coefficient values, including IDF components, divided by the sum of the word selectivity value functions only. This ratio thus reflects the extent to which the word terms have been reduced by the IDF values. Each of the word pair selectivity value functions are multiplied by this function, producing a similar reduction in the overall weight of the word pair terms, as indicated at 217.

The program now constructs, at 219, a search vector containing n words and m word pairs, having the form:

$$SV = c_1 w_1 c_2 w_2 + \ldots c_n w_n + c_1 wp_1 + c_2 wp_2 + \ldots c_m wp_m$$

Also as indicated at 221 in the figure, the vector may be modified to include synonyms for one or more "base" words ($w_i$) in the vector. These synonyms may be drawn, for example, from a dictionary of verb and verb-root synonyms such as discussed above. Here the vector coefficients are unchanged, but one or more of the base word terms may contain multiple words. When synonyms or employed in the search vector, the word list 50, which includes all of the TIDS for each descriptive word, may be modified as indicated in FIG. 12C. In implementing this operation, the program considers each of the synonym words added, as at 219, and retrieves from database 30B, the TIDs corresponding to each synonym, as at 221. These TIDs are then added to the TIDs in list 50 for the associated base word, as at 225. Final list 50 thus includes (i) each base word in a target text vector, (ii) coefficients for each base word, and (iii) all of the TIDs containing that word and (iv) if a base word includes synonyms, all TIDs for each synonym. Also as indicated in FIG. 12C, lists 50 and 52 may also include CIDs for each TID.

G. Text Searching and Ranking

Figure 13:
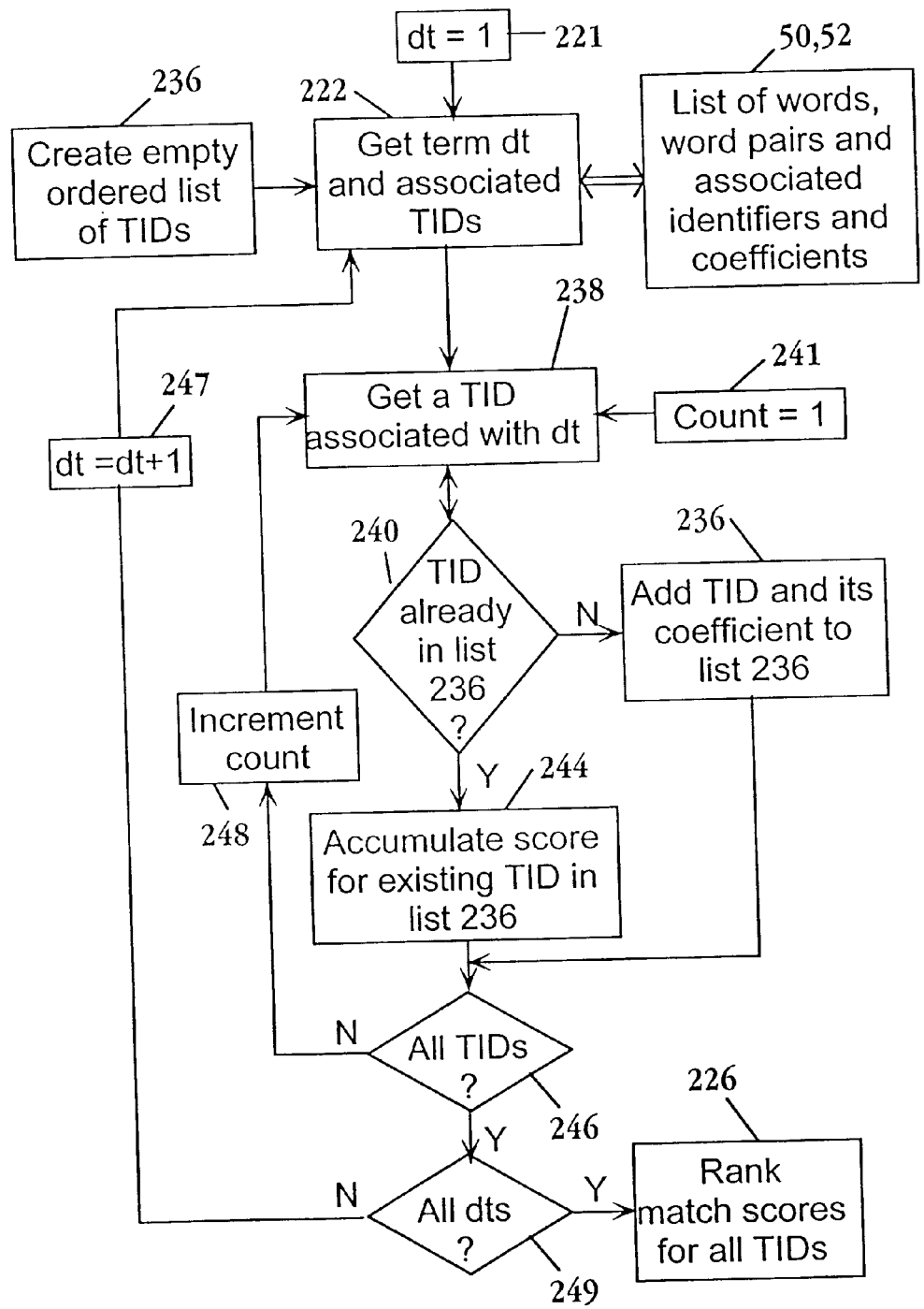
FIG. 13 is a flow diagrams of system operations for text matching.

The text searching module in the system, illustrated in FIG. 13, operates to find database texts having the greatest term overlap with the search vector terms, where the value of each vector term is weighted by the term coefficient.

An empty ordered list of TIDs, shown at 236 in the figure, will store the accumulating match-score values for each TID associated with the vector terms. The program initializes the descriptive term at 1, in box 221, and retrieves term dt and all of the TIDs associated with that term from list 50 or 52. As noted in the section above, TIDs associated with word terms may include TIDs associated with both base words and their synonyms. With TID count set at 1 (box 241) the program gets one of the retrieved TIDs, and asks, at 240: Is this TID already present in list 236. If it is not, the TID and the term coefficient is added to list 236, as indicated at 237, creating the first coefficient in the summed coefficients for that TID. Although not shown here, the program also orders the TIDs numerically, to facilitate searching for TIDs in the list. If the TID is already present in the list, as at 244, the coefficient is added to the summed coefficients for that term, as indicated at 244. This process is repeated, through the logic of 246 and 248, until all of the TIDs for a given term have been considered and added to list 236.

Each term in the search vector is processed in this way, though the logic of 249 and 247, until each of the vector terms has been considered. List 236 now consists of an ordered list of TIDs, each with an accumulated match score representing the sum of coefficients of terms contained in that TID. These TIDs are then ranked at 226, according to a standard ordering algorithm, to yield an output of the top N match score, e.g., the 10 or 20 highest-ranked matched score, identified by TID.

Figure 14:
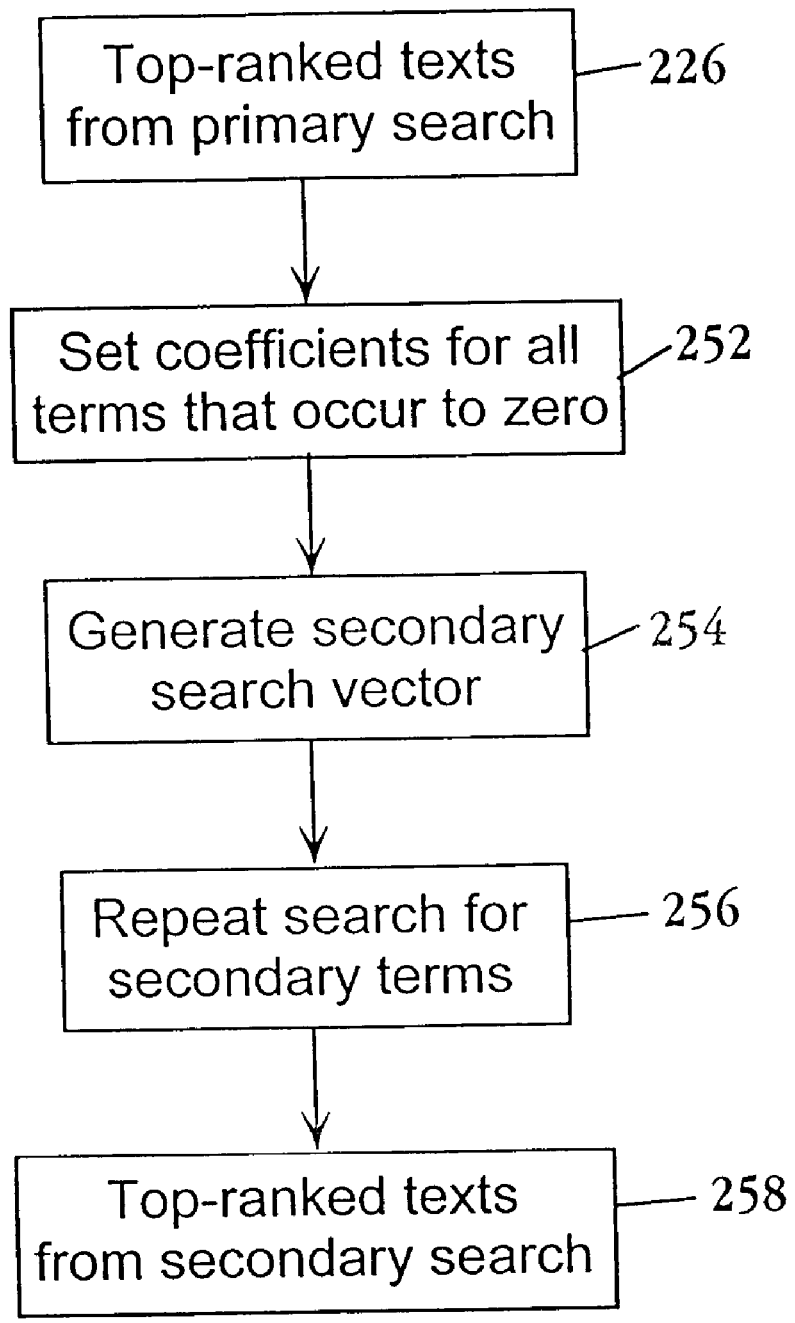
FIG. 14 is a flow diagram of system operations for text matching based in a secondary text-matching search based on terms underrepresented in a primary text-matching search.

The program may also function to find descriptive terms that are either unmatched or poorly matched (under-represented) with terms in the top-score matches from the initial (first-tier) search. This function is carried out according to the steps shown in FIG. 14. As seen in this figure, the program takes the texts with the top N scores, typically top 5 or 10 scores, and sets to zero, all of the vector coefficients that occur in at least one of top-ranked texts, as indicated at 252. That is, if a word or word pair occurs in at least one of the top N scores, its coefficient is set to zero, or alternatively, reduced in some systematic manner.

The vector remaining after setting the terms with at least one occurrence to zero becomes a second search vector, containing those words or word pairs that were underrepresented or unrepresented in the original search. The secondary vector is generated at 254, and the search described with respect to FIG. 13 is repeated, at 256, to yield a list of top-ranked texts for the secondary terms. The procedure may be repeated, if necessary, until all terms having an above-threshold coefficient, or a preselected number of terms, have been searched.

Figure 15:
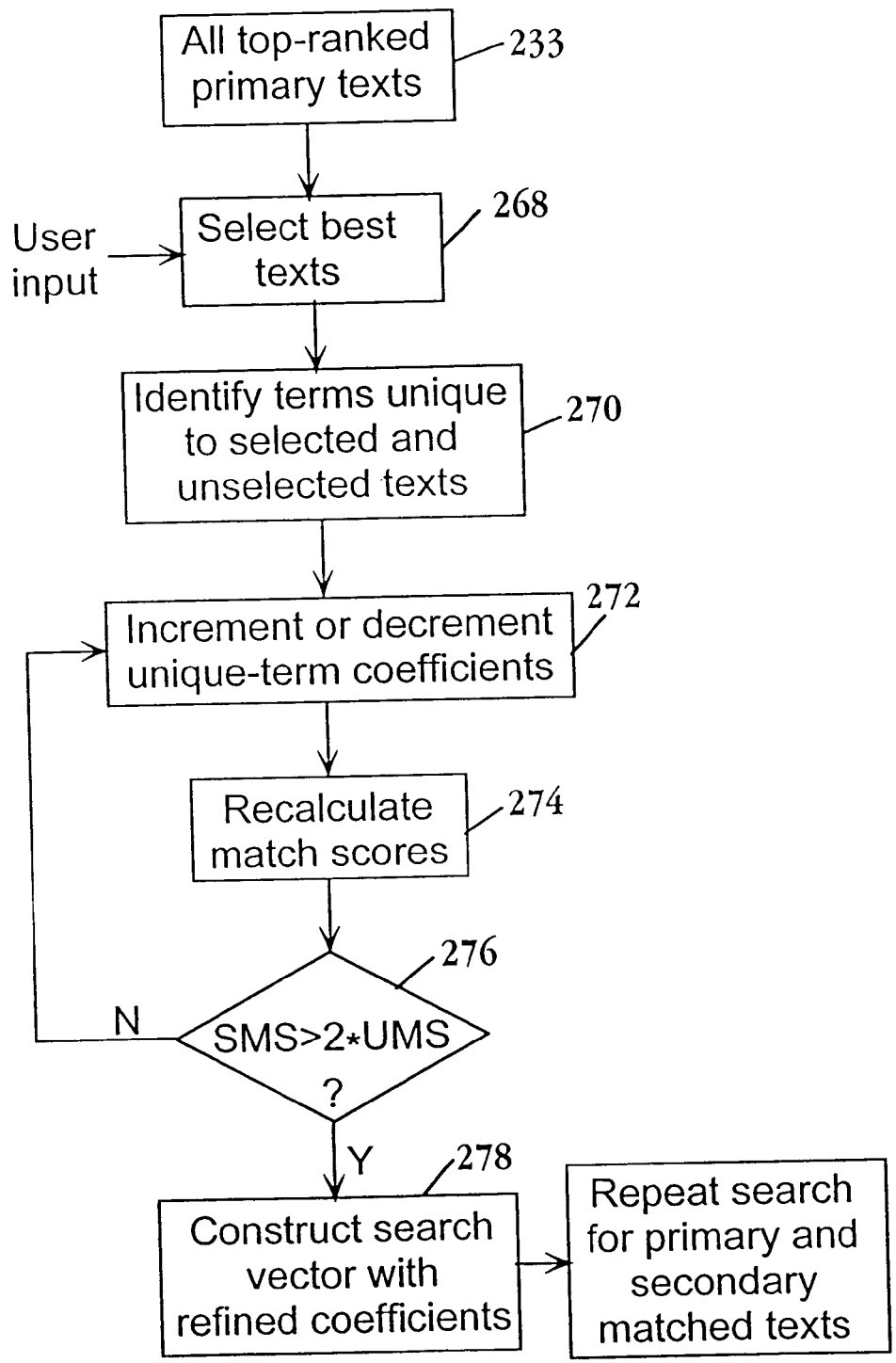
FIG. 15 is a flow diagram of feedback performance operations carried out by the system in refining a text-matching search.

FIG. 15 is a flow diagram of a system module used for feedback performance of the search results. The purpose of this module is to refine the search vector coefficients based on user selection of the most pertinent texts found in the initial search.

In operation, the actual texts of the N ranked texts, e.g., the abstracts for each of the top ten match-score texts, are presented to the user, at 233. The user then selects at 268 those text(s) that are most pertinent to the subject matter being searched, that is, the subject matter of the target text. If the user selects none of the top-ranked texts, the program may take no further action, or may adjust the search vector coefficients and rerun the search. If the user selects all of the texts, the program may present additional lower-ranked texts to the user, to provided a basis for discriminating between pertinent and less-pertinent references.

Assuming one or more, but not all of the presented texts are selected, the program identifies those terms that are unique to the selected texts (STT), and those that are unique to the unselected texts at 270 (UTT). The STT coefficients are incremented and/or the UTT coefficients are decremented by some selected factor, e.g., 10%, and the match scores for the texts are recalculated based on the adjusted coefficients, as indicated at 274. The program now compares the lowest-value recalculated match score among the selected texts (SMS) with the highest-value recalculated match score among the unselected texts (UMS), shown at 276. This process is repeated, as shown, until the SMS is some factor, e.g., twice, the UMS. When this condition is reached, a new search vector with the adjusted score is constructed, as at 278, and the search is text search is repeated, as shown.

H. Text Classification

This section describes a classification algorithm for determining classification from the top-ranked search texts and their associated CIDs obtained through the search routine discussed in the section above. The method is illustrated for patent classification into classification categories defined by the USPTO classification system. It will be appreciated, however, that method is applicable to classifying a variety a variety of target texts, as indicated above, requiring only that the sample texts giving the highest match score associated CIDs.

Figure 16:
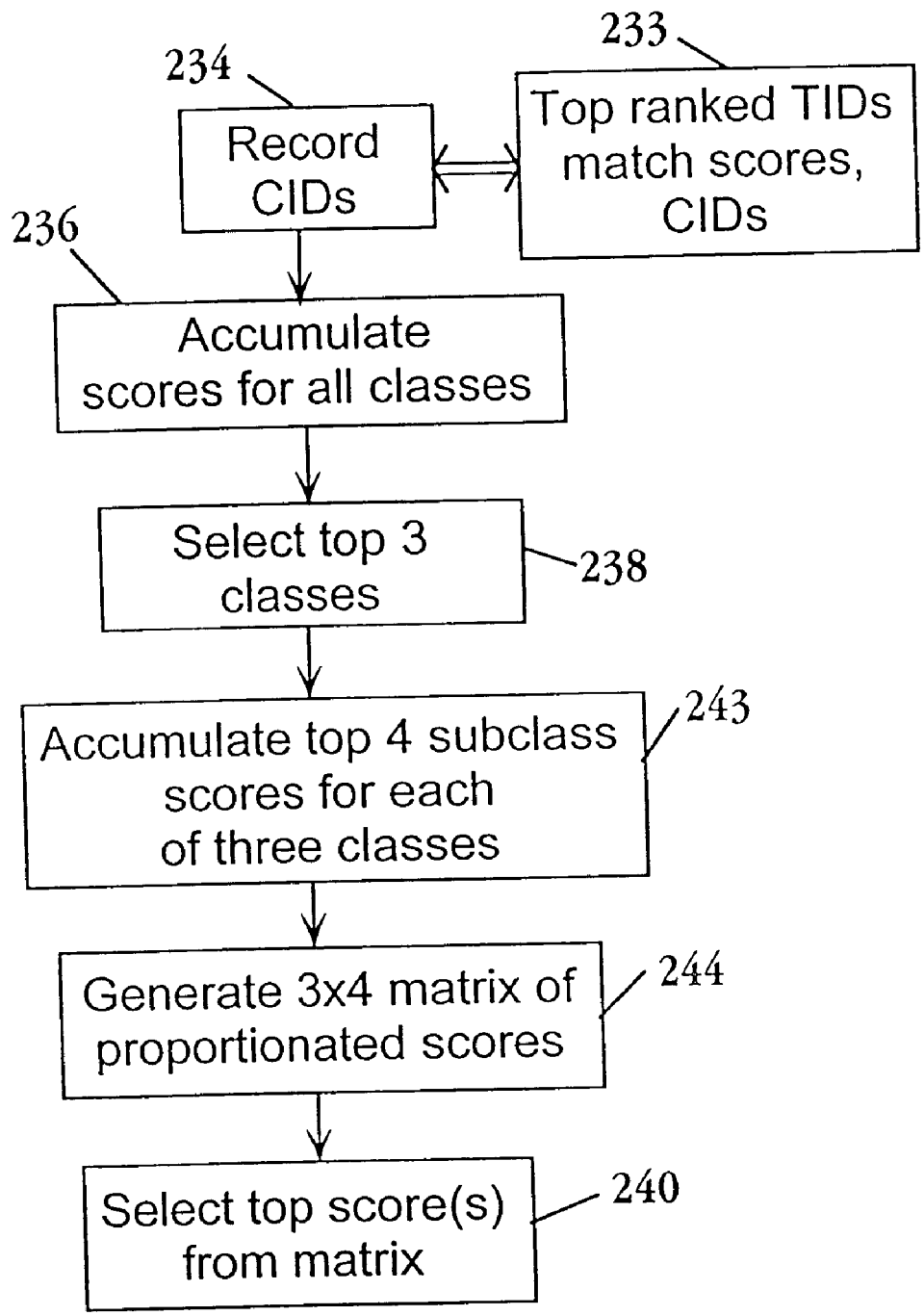
FIG. 16 is a flow diagram of system operations used for text classification.

The flow diagram for the classification module is shown at FIG. 16. Initially, the program accesses file 233 containing the TIDs of the N top-ranked matched texts, the match scores for each text, and the associated CIDs (in this case, class and subclass CIDs) for each text. The program records the class CIDs for each of the top ranked texts, at 234, and accumulates a weighted score for all classes, as at 236. That is, the program weights each of the class CIDs from the top N hits by the match score for the corresponding text, and sums the weighted-class CID values for all n texts. The top classification scores, e.g., top 3 class score, are then selected, at 238.

For each of the classes selected at 238, the program retrieves the subclass CIDs for that class, e.g., all of the subclass CIDs for each of the top three classes. The program now accumulates the weighted scores for the subclasses in each of these classes, as above, by weighting each subclass CID within a class by the match score for the corresponding text for the top n hits, and summing the weighted subclass CID values for all n texts in that class. The top subclass scores, e.g., up to four subclasses per class, are then selected, as at 243.

From these weighted class and subclass scores, the program generates a n×m, e.g., 3×4, confidence matrix of each of the n classes and each of the up to m subclasses in each class. The matrix values are proportionated so that the sum of the n class scores=1, and the sum of the subclass scores for each class is equal to the proportionated class value. Thus, the total of all of the matrix scores is equal to one.

As an example, applying the method of the invention to U.S. Pat. No. 6,143,676, the above scoring method gave the following class and subclass scores:

Class 419, score = 837.188, subclasses 68, 42, 38, 54
Class 264, score = 317.347, subclasses 102, 629, 59, 65
Class 75, score = 146.767, subclasses 229, 232

| Class scores (%) | Confidence matrix | | | |
|---|---|---|---|---|
| 0.643347 | 0.37022 | 0.0916637 | 0.0916637 | 0.08979987 |
| 0.243869 | 0.0649329 | 0.0644895 | 0.057649 | 0.0563922 |
| 0.112784 | 0.0563922 | 0.0563922 | | |

This matrix indicates that class 419, subclass 68 is determined with a confidence factor of 0.37022, class 264, subclass 102, with a confidence factor of 0.0649329, and so forth.

The program uses the matrix to calculate the top classifications (best confidence values), for example, the top three class and subclass CIDs for a given target.

In one embodiment, each of the libraries of texts used in determining selectivity values is defined by one or more classification IDs. As each new target is classified by the system, typically without user feedback, that target is added to the library of texts defined by the corresponding target classification. In this manner, the library of texts becomes self-organizing, in that each new target is added to one of the text libraries, and is used in the determination and classification of additional targets. It will be appreciated that the process of "adding" a new target to the libraries of texts will depend on the type of database used in the system. For example, where the system employs a word-records database, adding a new target will include (i) identify all non-generic words in the new target, and (ii) for each such word, adding to an existing word record (or a new record if necessary)), the corresponding text identifier, classification ID, library ID (based on the classification ID), and word position IDs.

Examples 1, 3 and 4. below provided details of the method applied to a large group of U.S. patents. Each patent includes, as part of its bibliographic information, the PTO office classification, given by class and subclass, and one or more, and typically several cross classes and subclasses which were also searched or considered pertinent classifications by the patent examiner in charge of prosecution of the patent. The target text used in each case was the abstract for that patent. The library texts searched was a text database of U.S. patents issued between 1976 and 2000, grouped into the six different-technology libraries indicated above.

I. Second-Tier Searching.

The program may also function to find descriptive terms that are either unmatched or poorly matched (under-represented) with terms in the top-score matches from the initial (first-tier) search, as indicated at 234 in FIG. 13. This function is carried out by Module I, whose operation is shown in FIG. 15. As seen, the program takes the top-score matches from the original search (box 233), and initializes each descriptive term (word and optionally, word group) from the target text to 1 (box 250). The total number of top-score TIDs containing that term is then counted and recorded, at 252, to determine the "representation" of that term in the top-ranked texts. If the number of texts containing the term is below a given threshold n, e.g., 2–3, the term is recorded at 258 and set aside for a second-tier search. The program then proceeds to the next descriptive term, through the logic at 260, 256, until all the target terms have been processed. The result is a list 262 of target-text descriptive terms that are either not present or present only in one or few of the top-ranked texts.

As indicated at 264 in FIG. 15, this group of under-represented terms is then used to conduct a second-tier search, following the search process described above, but limited to those search terms identified at 262. After carrying out the second-tier search, and identifying the top match-score texts, the descriptive terms may then be reevaluated for descriptive terms that may still be under-represented, and carry out third-tier or more additional searches, limited to the under-represented terms.

J. System Interface

Figure 17:
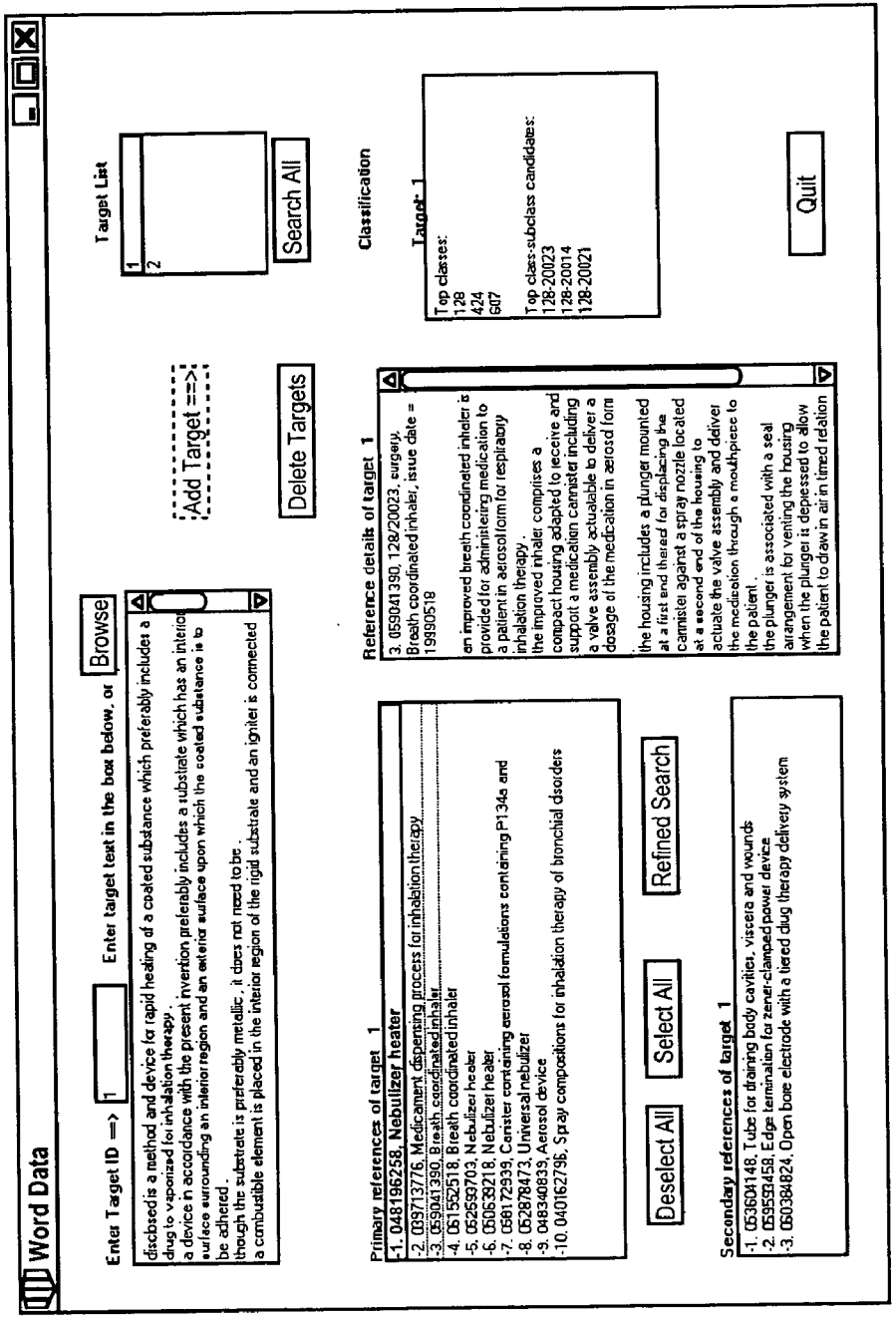
FIG. 17 shows a user interface for the search and classification system of the invention.

The system interface is shown at FIG. 17. To initiate a search or classification procedure, the user inputs a natural-langauge document, e.g., an abstract or independent claim in a patent or patent application, into the text box at the upper left of the interface. The text is then entered as a target in the target list at the upper right. The "Search All" button initiates the search, which will yield (i) titles and text identifiers for the 10 top-ranked primary texts in the box labeled "Primary references of target," (ii) titles and text identifiers for the 3 top-ranked secondary texts in the box labeled "Secondary references of target," and top classifications in the "Classification" box. To read the abstract associated with each top-ranked text, the user clicks on the title for that text in one of the two reference boxes, and the text along with other identifying information is displayed in the center box entitled "Referenced details of target." Typical search and report time is about one minute, using the word-record database approach for searching, and in a database containing about 1 million patent records.

To perform a refined, performance-feedback search, the user highlights each of the primary references that are selected as "pertinent." The Refined Search button then initiates a search of the top N texts from the initial search, typically top 1,000–5,000 texts, using a modified search generated as above. The refined search operation can be repeated until a desired group of primary references are found. Since the program is now only search a small subset of the total database, the refined (and secondary) search takes very little time, on the order of a few seconds or less.

From the foregoing, it will be appreciated how various objects and features of the invention are met. The system is capable of processing text in a completely automated fashion, i.e., without user intervention or guidance, to process a text into key (descriptive) words and word groups, for purposes of text-match searching and text classification. In particular, no pre-classification decision is required, nor does the user even need to read or understand of the input text in order to perform an effective search. In fact, the program function can be duplicated for virtually any natural language for which suitable libraries of texts exist, without the user having any knowledge of the language structure or vocabulary.

Particularly where the system employs a word records database as described herein, total processing time can be reduced to a few minutes or less. The output of the classification process can also include information, i.e., texts, from the top-ranking text matches, thus allowing the user to locate documents most closely related to the target text as part of the classification process. Finally, the invention is applicable to a wide variety of text classification tasks, as indicated herein, the only requirements being (i) a source of selectivity values for words, and optionally, word groups derived from a text to be classified (the target text), and (ii) sample texts which contain representative numbers of texts in each of two or more classifications which one wishes to assigned to the target text.

The following examples illustrate, without limitation, various methods and results obtained by the invention.

EXAMPLE 1

Optimizing Search Vector Coefficients Based on Classification

Figure 19A:
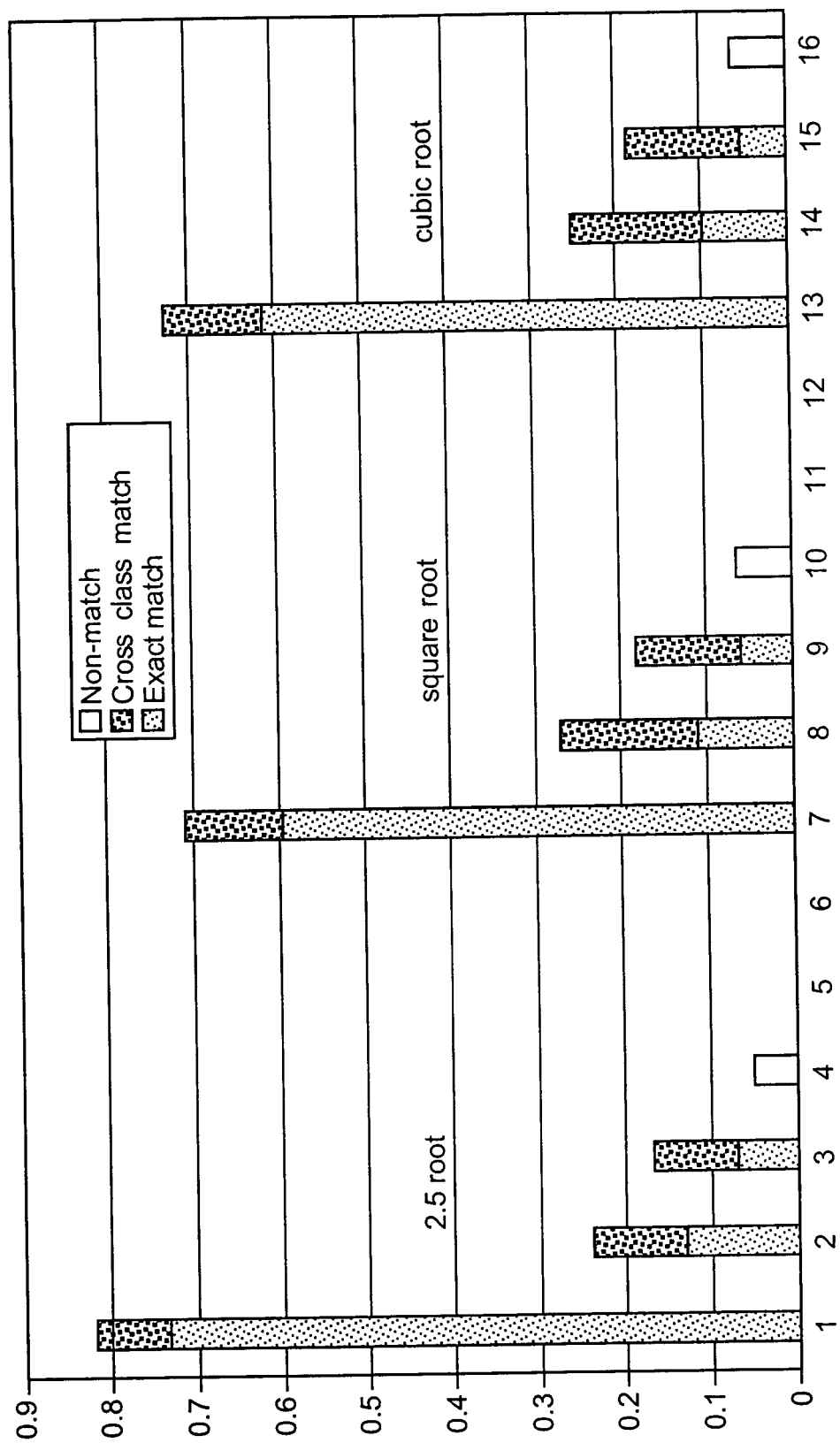
FIGS. 19A and 19B are plots showing classification efficiency achieved with root functions of 2, 2.5, and 3, (19A), and as a function to the number of top matches considered (19B)
Figure 19B:
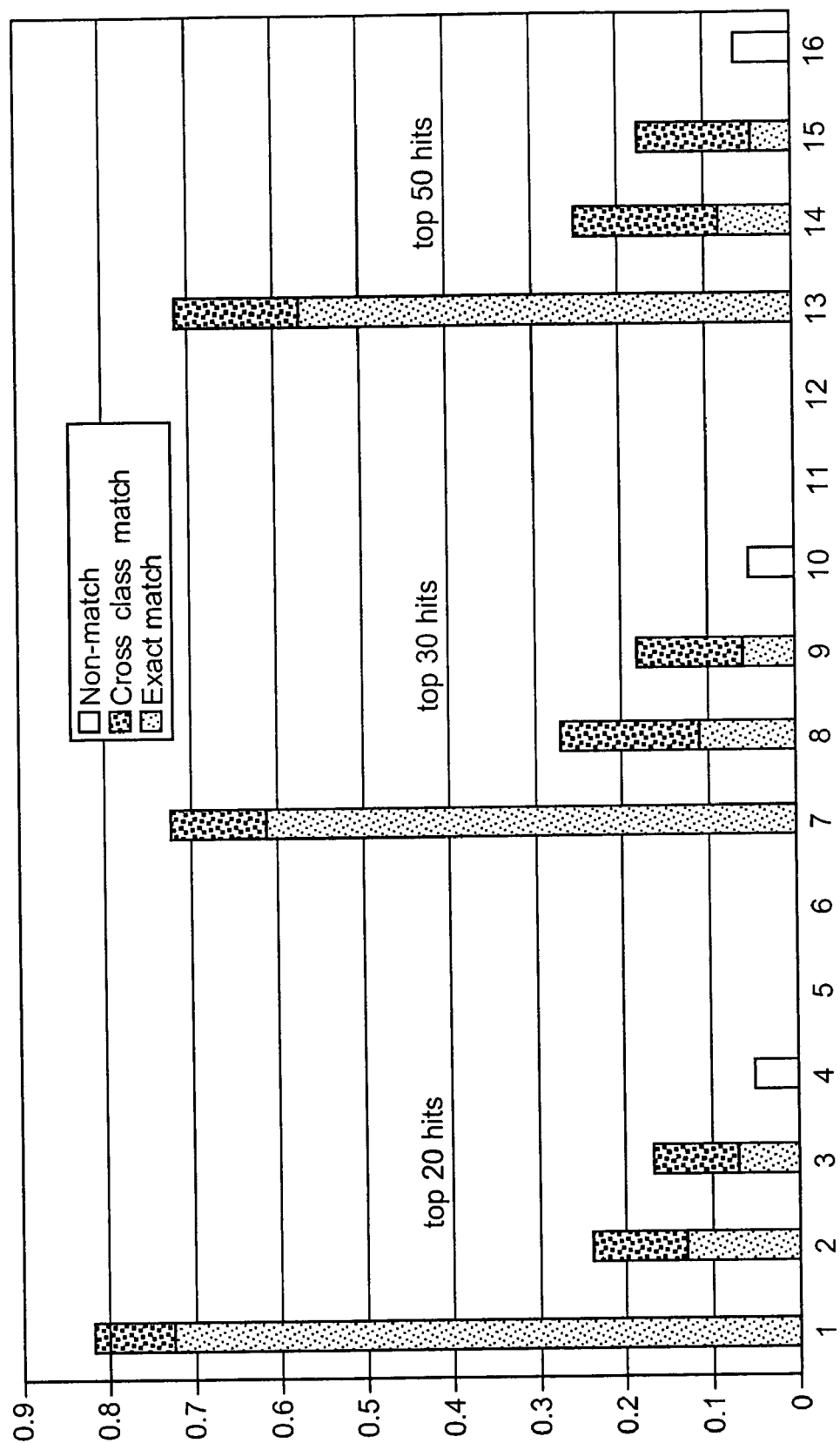

Initially, 30 of the 164 patents were selected at random to determine preferred root function and optimal value of n, the number of top-ranked texts considered for classification. The results are shown in FIGS. 19A and 19B, respectively. Both of these figures contain three sets of four bars. In each set, the first bar represents the percentage of first-choice (top) classifications that are identical to the PTO office classes (light shading), or are identical to one of the PTO cross classes (heavy shading). The second and third bars represent the percentage of second- and third-choice classifications, respectively, that are identical to the PTO office classes (light shading), or are identical to one of the PTO cross classes (heavy shading). The fourth bar represents the percentage of op-three choices that do not correspond to either an office class or subclass. As seen in FIG. 16A, the best classification results are obtained using a selectivity value root function of 2.5. As seen in FIG. 16B, the best classification results (using a selectivity value root function of 2.5) are achieved by considering the top 20 match-score texts only.

EXAMPLE 2

Using performance feedback to construct model collections

Figure 18:
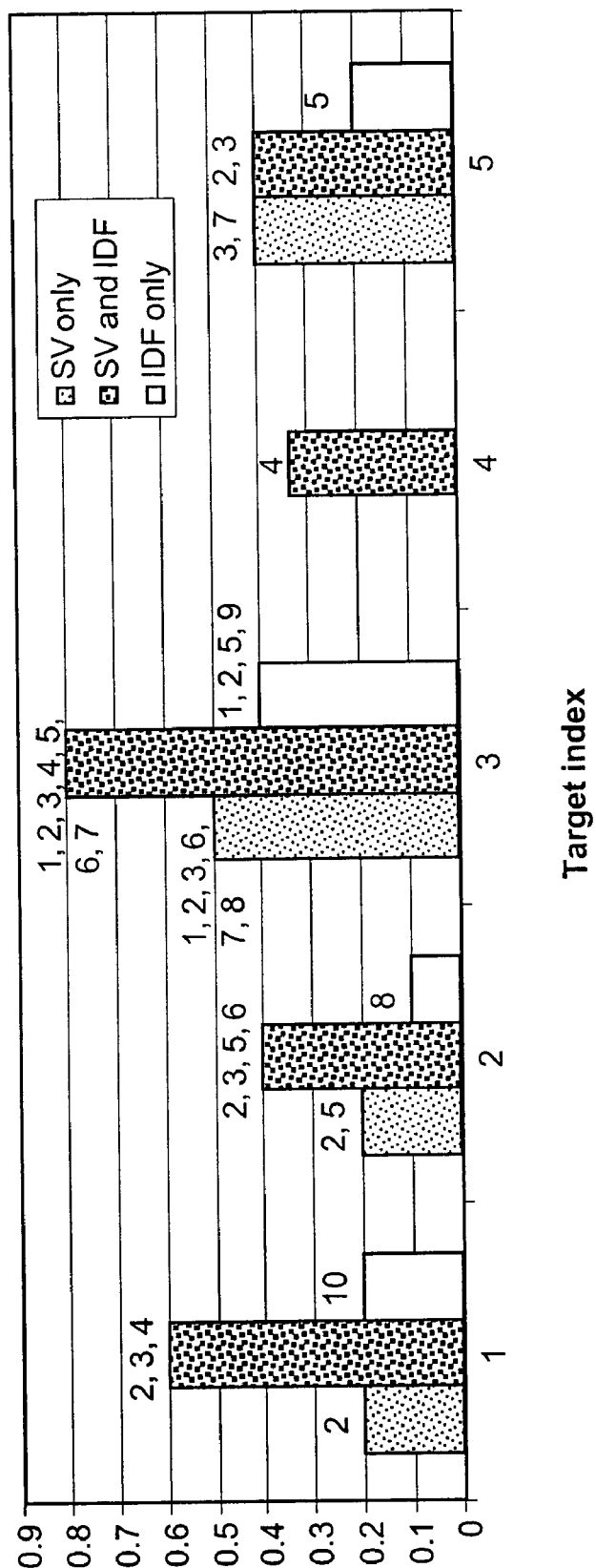
FIG. 18 are bar graphs showing of percentage of text matches with various combinations of selectivity value and inverse document frequency value coefficients, relative to five reference collections of matched texts produced by a iterated performance feedback searching.

Five patent abstracts were processed by the system to yield 10 top-ranked primary matches. The most pertinent of these were user selected, and a refined search based on a recalculated search was performed to yield up to 10 top-ranked texts. This group of texts established, for each target, a standard set of most-pertinent references. The system was then run on the same five targets, but where the search vector coefficients included selectivity value (SV) along, IDF alone, or the two together. The results from each of these three searches were then compared with the standard set for each of the five targets, with the results shown in FIG. 18. Each bar in the graph represents the percentage of toip-ranked hits also present in the standard, and identifies the match numbers. Thus, for example, in the first target group (three bars at the left in the figure), a search with SV alone yielded 20% of the standard set (1 out of five), identified as text 2, SV plus IDF yielded 3 out of the standard five, identified as 2, 3, and 4, and IDF alone yielded 1 out of five, identified as text 10. As seen, the teo coefficient components, SV and IDF, gave better correspondence with the staddard set for all five target sets.

EXAMPLE 3

Classification Results as a Function of Search Vector Coefficients

Figure 20:
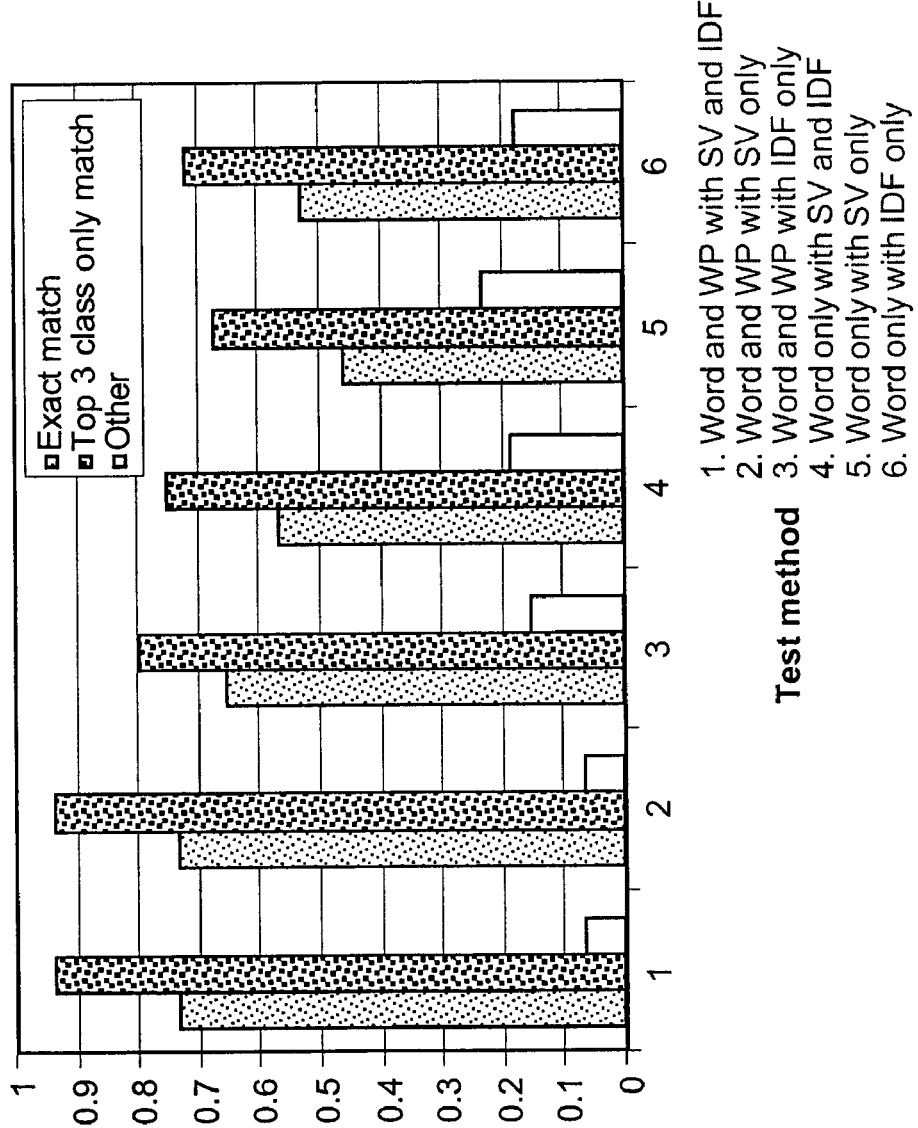
FIG. 20 is a bar graph illustrating classification efficiency with and without wordpair terms, and combinations of selectivity value and inverse document frequency value coefficients.

In this text, 150 patent abstracts were classified by the system, employing six different search vector combinations, as indicated in the key in FIG. 20. The first three vectors used both word and wordpair terms, and the second three, word terms alone. In each set, the coefficients used were either SV+IDF, or DV or IDF alone. The classification results are presented in FIG. 20, showing, for each set, exact class and subclass match with the PTO office classification, top class match among the top three choices, and no corresponding classification. As seen, best classification results were achieved with word and word pair terms, using both SV+IDF or SV alone. However, the data presented Example 2 above indicates that the best search results are obtained using both SV+IDF in the word coefficients.

EXAMPLE 4

Classification of 300 Patents

Figure 21:
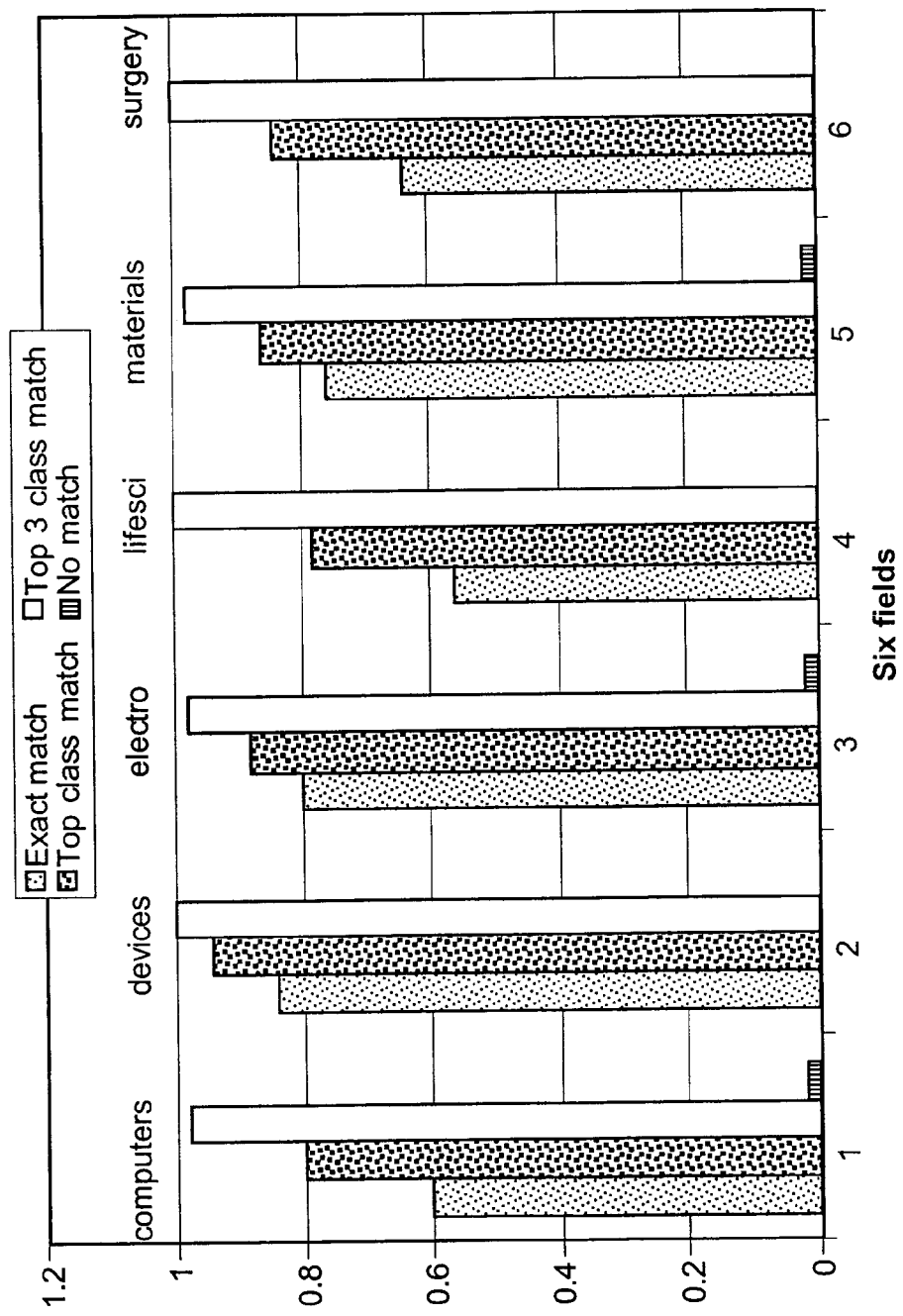
FIG. 21 is a bar graph showing the correspondence between actual PTO patent classifications and patent classifications determined in accordance with the present invention for each of 50 patents in six different technology areas.

For each of the six technology areas identified in FIG. 21, 50 target abstracts were selected at random. Each abstract was classified in the system, employing both SV and IDF values for the word coefficients, SV coefficients for word pair coefficients, and verb-word synonyms. The class and subclass scores were compared with the PTO office classifications assigned to each target. For each technology group, the results were plotted as (i) percentage of targets for which the top classification choice gave an exact class and subclass match with the PTO classification (dark bar at the extreme left in each group), (ii) percentage of targets for which the top classification choice gave an exact class match (but not necessarily subclass) with the PTO classification (dark bar at the middle left in each group), (iii) percentage of targets for which one of the top three classification choices gave an exact class match with the PTO classification (light bar at the middle right in each group), and (iv) percentage of targets for which no corresponding classification was found in the top three choices. As seen, exact class and subclass choices were found in about 60–80% of the targets in the various groups, and exact class matches were found for about 80–90% of targets for the various fields. When the top three choices are considered, the sytem accurately determined a correct classification for all but 3 of the 300 targets examined.

Although the invention has been described with respect to particular features and embodiments, it will be appreciated that various modifications and changes may be made without departing from the spirit of the invention.

What is claimed is:

1. A computer-executed method for classifying a target document in the form of a digitally encoded natural-language text into one or more of two or more different classes, comprising the steps of:
    (a) for each of a plurality of terms selected from one of (i) non-generic words in the document, (ii) proximately arranged word groups in the document, and (iii) a combination of (i) and (ii), determining a selectivity value calculated as the frequency of occurrence of the term in a library of texts in one field, relative to the frequency of occurrence of the same term in one or more other libraries of texts in one or more other fields, respectively,
    (b) representing the document as a vector of terms, where the coefficient assigned to each term is a function of the selectivity value determined for the term,
    (c) determining for each of a plurality of sample texts, a match score related to the number of descriptive terms present in or derived from the text that match those in the target document, where each of the plurality of sample texts has an associated classification identifier that identifies the one or more different classes to which the text belongs,
    (d) selecting one or more of the sample texts having the highest match scores,
    (e) recording the one or more classification identifiers associated with the one or more sample texts having the highest match scores, and
    (f) associating the one or more classification identifiers from step (e) with the target document, thereby to classify the target document as belonging to one or more classes represented by at least one of the classification identifiers from step (e).

2. The method of claim 1, wherein the sample texts are texts in the libraries of texts from which the selectivity values of target terms are determined.

3. The method of claim 2, wherein each library of texts is defined by one or more text classifications, and which further includes, following said classifying step (e), adding the target document in one of said library of texts corresponding to the target text classification.

4. The method of claim 1, wherein the selectivity value associated with a term in is related to the greatest selectivity value determined with respect to each of a plurality $N \geq 2$ of libraries of texts in different fields.

5. The method of claim 1, wherein the selectivity value assigned to a descriptive term is a root function of the frequency of occurrence of the term in said library, relative to the frequency of occurrence of the same term in one or more other libraries of texts in one or more other fields, respectively, and the match score is weighted by the selectivity values of the matching terms.

6. The method of claim 1, wherein only terms having a selectivity value above a predetermined threshold are included in the vector.

7. The method of claim 1, wherein the terms include words in the document, and the coefficient assigned to each word in the vector is also related to the inverse document frequency of the word in one or more of said libraries of texts.

8. The method of claim 6, wherein the coefficient assigned to each word in the vector is the product of a function of the selectivity value and the inverse document frequency of the word.

9. The method of claim 1, wherein the terms include words in the document, and step (a) includes (i) accessing a database of word records, where each record includes text identifiers of the library texts that contain the word, and associated library identifiers for each text, and (ii) using the identified text and library identifiers to calculate one or more selectivity values for the word.

10. The method of claim 9, wherein carrying out the step of determining match scores includes (i) accessing said database of word records to identify library texts associated with each descriptive word in the target text, and (ii) from the identified texts recorded in step (i), determining text match score based on the number of descriptive words in the text weighted by the selectivity values of the matching words.

11. The method of claim 1, wherein the terms include word groups in the document, and said database further includes, for each word record, word-position identifiers, and wherein step (a) as applied to word groups includes (i) accessing said database to identify texts and associated library and word-position identifiers associated with the word group, (ii) from the identified texts, library identifiers, and word-position identifiers recorded in step and (i) determining one or more selectivity values for the word group.

12. The method of claim 11, wherein carrying out the step of determining match scores includes (i) recording the texts associated with each descriptive word group, and (ii) determining a text match score based, at least in part, on number of descriptive word groups in a text, weighted by the selectivity values of such words groups.

13. The method of claim 1, wherein each different library of texts defines a class having its own classification identifier.

14. The method of claim 1, wherein each library of texts contains texts with multiple different classification identifiers.

15. The method of claim 1, wherein said sample texts and corresponding classification identifiers are selected from the group consisting of:
(a) libraries of different-field patent texts, and said classification identifier includes at least one patent class and, optionally, at least one patent subclass;
(b) libraries of different-field research grant proposals or reports, and said classification identifier includes a research funding class within that agency;
(c) libraries of case reports or head notes relating to different legal topics, and said classification identifier includes one or more different legal topics; and
(d) libraries of different-field scientific or technical texts, and said classification identifier includes at least one of a plurality of different science or technology filed classifications.

16. An automated system for classifying a target document in the form of a digitally encoded text as belonging to one or more of a plurality of different classes comprising
(1) a computer,
(2) accessible by said computer, a database of word records, where each record includes text identifiers of the library texts that contain the word, associated library and classification identifiers for each text, and optionally, one or more selectivity values for each word, where the selectivity value of a term in a library of texts in a field is related to the frequency of occurrence of the term in said library, relative to the frequency of occurrence of the same term in one or more other libraries of texts in one or more other fields, respectively,
(3) a computer readable code which is operable, under the control of said computer, to perform steps comprising:
(a) for each of a plurality of terms selected from one of (i) non-generic words in the document, (ii) proximately arranged word groups in the document, and (iii) a combination of (i) and (ii), determining a selectivity value calculated as the frequency of occurrence of the term in a library of texts in one field, relative to the frequency of occurrence of the same term in one or more other libraries of texts in one or more other fields, respectively,
(b) representing the document as a vector of terms, where the coefficient assigned to each term is a function of the selectivity value determined for the term,
(c) determining for each of a plurality of sample texts, a match score related to the number of descriptive terms present in or derived from the text that match those in the target document, where each of the plurality of sample texts has an associated classification identifier that identifies the one or more different classes to which the text belongs,
(d) selecting one or more of the sample texts having the highest match scores,
(e) recording the one or more classification identifiers associated with the one or more sample texts having the highest match scores, and
(f) associating the one or more classification identifiers from step (e) with the target document, thereby to classify the target document as belonging to one or more classes represented by at least one of the classification identifiers from step (e).

17. The system of claim 16, wherein the terms include words in the document, and step (a) includes (i) accessing a database of word records, where each record includes text identifiers of the library texts that contain the word and associated library identifiers for each text, and (ii) using the identified text and library identifiers to calculate one or more selectivity values for the word.

18. The system of claim 17, wherein carrying out the step of determining match scores includes (i) accessing said database of word records to identify library texts associated with each descriptive word in the target text, and (ii) from the identified texts recorded in step (i), determining text match score based on the number of descriptive words in the text weighted by the selectivity values of the matching words.

19. The system of claim 16, wherein the terms include word groups in the document, and said database further includes, for each word record, word-position identifiers, and wherein step (a) as applied to word groups includes (i) accessing said database to identify texts and associated library and word-position identifiers associated with the word group, (ii) from the identified texts, library identifiers, and word-position identifiers recorded in step and (i) determining one or more selectivity values for the word group.

20. The system of claim 19, wherein carrying out the step of determining match scores includes (i) recording the texts associated with each descriptive word group, and (ii) determining a text match score based, at least in part, on number of descriptive word groups in a text, weighted by the selectivity values of such words groups.

21. The system of claim 16, wherein said library texts and corresponding classification identifiers are selected from the group consisting of:
  (a) libraries of different-field patent texts, and said classification identifier includes at least one patent class and, optionally, at least one patent subclass;
  (b) libraries of different-field research grant proposals or reports, and said classification identifier includes a research funding class within an agency;
  (c) libraries of case reports or head notes relating to different legal topics, and said classification identifier includes one or more different legal topics; and
  (d) libraries of different-field scientific or technical texts, and said classification identifier includes at least one of a plurality of different science or technology filed classifications.

22. Computer readable code for use with an electronic computer and a database word records in classifying a target document in the form of a digitally encoded text as belonging to one or more of a plurality of different classes, where each record in the word records database includes text identifiers of the library texts that contain the word, an associated library identifier for each text, an associated classification identifier for each text, and optionally, one or more selectivity values for each word, where the selectivity value of a term in a library of texts in a field is related to the frequency of occurrence of the term in said library, relative to the frequency of occurrence of the same term in one or more other libraries of texts in one or more other fields, respectively, said code being operable, under the control of said computer, to perform steps comprising:
  (a) for each of a plurality of terms selected from one of (i) non-generic words in the document, (ii) proximately arranged word groups in the document, and (iii) a combination of (i) and (ii), determining a selectivity value calculated as the frequency of occurrence of the term in a library of texts in one field, relative to the frequency of occurrence of the same term in one or more other libraries of texts in one or more other fields, respectively,
  (b) representing the document as a vector of terms, where the coefficient assigned to each term is a function of the selectivity value determined for the term,
  (c) determining for each of a plurality of sample texts, a match score related to the number of descriptive terms present in or derived from the text that match those in the target document, where each of the plurality of sample texts has an associated classification identifier that identifies the one of more different classes to which the text belongs,
  (d) selecting one or more of the sample texts having the highest match scores,
  (e) recording the one or more classification identifiers associated with the one or more sample texts having the highest match scores, and
  (f) associating the one or more classification identifiers from step (e) with the target document, thereby to classify the target document as belonging to one or more classes represented by at least one of the classification identifiers from step (e).

* * * * *